United States Patent
Maeda et al.

(10) Patent No.: US 9,868,162 B2
(45) Date of Patent: Jan. 16, 2018

(54) MACHINING HEAD, HOLDER AND EXCHANGEABLE TIP CUTTING TOOL

(71) Applicant: HITACHI TOOL ENGINEERING, LTD., Tokyo (JP)

(72) Inventors: Katsutoshi Maeda, Kusatsu (JP); Makoto Baba, Moriyama (JP)

(73) Assignee: HITACHI TOOL ENGINEERING, LTD., Tokyo (JP)

( * ) Notice: Subject to any disclaimer, the term of this patent is extended or adjusted under 35 U.S.C. 154(b) by 385 days.

(21) Appl. No.: 14/388,622

(22) PCT Filed: Mar. 27, 2013

(86) PCT No.: PCT/JP2013/059002
§ 371 (c)(1),
(2) Date: Sep. 26, 2014

(87) PCT Pub. No.: WO2013/146882
PCT Pub. Date: Oct. 3, 2013

(65) Prior Publication Data
US 2015/0063928 A1    Mar. 5, 2015

(30) Foreign Application Priority Data
Mar. 29, 2012  (JP) ................. 2012-077071

(51) Int. Cl.
*B23B 31/11* (2006.01)
*B23C 5/10* (2006.01)
(Continued)

(52) U.S. Cl.
CPC .......... *B23C 5/109* (2013.01); *B23B 31/1122* (2013.01); *B23C 5/006* (2013.01);
(Continued)

(58) Field of Classification Search
CPC . B23B 31/1115; B23B 31/1107; B23B 31/11; B23B 31/1122; F16B 33/02;
(Continued)

(56) References Cited

U.S. PATENT DOCUMENTS 1,407,335 A  *  2/1922  Reynolds ............ B23B 31/1107
                                                    279/100
2,328,602 A      9/1943  Bechler
(Continued)

FOREIGN PATENT DOCUMENTS

EP  1847345 A2  10/2007
JP  U-4-77017   7/1992
(Continued)

OTHER PUBLICATIONS

Jul. 14, 2015 European Search Report issued in European Patent Application No. EP 13 76 9329.
(Continued)

*Primary Examiner* — Sara Addisu
(74) *Attorney, Agent, or Firm* — Oliff PLC

(57) ABSTRACT

An exchangeable tip cutting tool in which breakage of the threaded section and breakage of the thread ridges during installation of the machining head and under increased cutting load during cutting are limited and which is capable of performing machining with high efficiency; and a machining head and a holder to be used in the exchangeable tip cutting tool.

2 Claims, 10 Drawing Sheets

(51) Int. Cl.
   *B23C 5/00*   (2006.01)
   *B23C 5/22*   (2006.01)
(52) U.S. Cl.
   CPC .............. *B23C 5/10* (2013.01); *B23C 5/22*
      (2013.01); *B23C 2210/02* (2013.01); *B23C*
      *2210/03* (2013.01); *B23C 2240/32* (2013.01);
      *Y10T 407/1906* (2015.01); *Y10T 407/1924*
      (2015.01); *Y10T 407/1948* (2015.01)
(58) Field of Classification Search
   CPC ....... B23C 2210/03; B23C 5/006; B23C 5/10;
      B23C 5/109; B23C 2210/02; B23C
      2240/32
   USPC .................. 407/54; 408/226, 233, 239 R
   See application file for complete search history.

(56) References Cited

U.S. PATENT DOCUMENTS

| | | | | |
|---|---|---|---|---|
| 2,606,778 | A | | 8/1952 | Myhre |
| 3,047,316 | A | * | 7/1962 | Wehring .............. E21B 17/042 285/334 |
| 3,586,353 | A | * | 6/1971 | Lorenz ................. E21B 17/042 285/334 |
| 4,799,844 | A | | 1/1989 | Chuang |
| 4,828,294 | A | * | 5/1989 | Bounie ................. F16L 15/002 264/162 |
| 4,907,926 | A | * | 3/1990 | Wing ...................... F16B 33/02 411/366.3 |
| 5,971,670 | A | * | 10/1999 | Pantzar .............. B23B 31/1107 407/119 |
| 7,611,311 | B2 | * | 11/2009 | Kakai ................. B23B 31/1107 279/8 |
| 8,944,732 | B2 | * | 2/2015 | Osawa .................. B23B 31/005 408/226 |
| 2001/0041089 | A1 | * | 11/2001 | Hecht .................... B23B 31/11 403/343 |
| 2002/0021945 | A1 | * | 2/2002 | Harpaz ................... B23B 31/11 407/53 |
| 2003/0210963 | A1 | * | 11/2003 | Kakai ................... B23B 31/008 408/231 |
| 2006/0073744 | A1 | * | 4/2006 | Jonsson ................ B23B 31/11 439/884 |
| 2007/0248421 | A1 | | 10/2007 | Kakai et al. |
| 2008/0304923 | A1 | * | 12/2008 | Lehto ................... B23B 31/005 407/100 |
| 2009/0010709 | A1 | * | 1/2009 | Berglow ................ B23B 31/11 403/343 |
| 2010/0014928 | A1 | | 1/2010 | Kakai et al. |
| 2012/0093602 | A1 | | 4/2012 | Osawa et al. |
| 2014/0308082 | A1 | * | 10/2014 | Abe .................... B23B 31/1122 407/37 |
| 2015/0151365 | A1 | * | 6/2015 | Haimer .............. B23B 31/1107 279/99 |
| 2015/0217380 | A1 | * | 8/2015 | Haimer ................ B23B 31/005 279/99 |
| 2015/0314379 | A1 | * | 11/2015 | Sharivker ................ B23C 5/10 407/34 |

FOREIGN PATENT DOCUMENTS

| | | |
|---|---|---|
| JP | A-8-177831 | 7/1996 |
| JP | A-2007-290120 | 11/2007 |
| JP | A-2010-284752 | 12/2010 |
| WO | WO 03/014584 A1 | 2/2003 |
| WO | 2010143315 A1 | 12/2010 |

OTHER PUBLICATIONS

International Search Report issued in International Patent Application No. PCT/JP2013/059002 dated May 7, 2013.
International Preliminary Report on Patentability issued in International Patent Application No. PCT/JP2013/059002 dated Oct. 1, 2014.

\* cited by examiner

MACHINING HEAD, HOLDER AND EXCHANGEABLE TIP CUTTING TOOL

FIELD OF THE INVENTION

This invention relates to a machining head detachable by screwing, a holder, and an exchangeable tip cutting tool.

BACKGROUND OF THE INVENTION

The commonly used cutting tools are solid end mills, which are made of cemented carbide from the tips of the edges to the shanks, and inserted tools, of which the bodies are made of steel and the edges are exchangeable carbide tips. Since solid end mills are formed integrally from the tip to the shank, they have high precision and are commonly used in finishing processing. Inserted tools have lower precision than solid end mills because of an insertion error due to tip-insertion process and the like, and are commonly used in rough processing. Also, inserted tools can be manufactured at low cost compared to solid end mills since only the tips of inserted tools are made of cemented carbide.

In recent years, exchangeable tip cutting tools in which a machining head having a cutting edge can be screwed to a holder are widely spreading. Exchangeable tip cutting tools can be manufactured at lower cost than solid end mills and generally have higher precision than inserted tools. Even if the machining head is an inserted tool, it is still useful because it can be modified into various types of tools by replacing only the machining head. These exchangeable tip cutting tools are designed so that the cutting load is applied in the tightening direction during cutting, and, therefore, the machining head does not unscrew during cutting. However, there are problems that fracture or breakage of the threaded section occurs when an enormous load is applied because of the increased cutting load due to abrasion of the tools. Also, even if there is no fracture nor breakage, there is still such a problem that the tightening torque increases during cutting and detaching the machining head becomes difficult.

To solve these problems, ideas to enhance the strength of threads by improving the shapes of threads and to make detaching the head easier are proposed. Also, not only for threads of the exchangeable tip cutting tools, but various proposals are made for commonly used threads as well.

In Patent Document 1, an exchangeable tip machining head in which the leading flank angle and the following flank angle of the male screw are optimized is described. It is described that use of a buttress thread having the following flank angle that is smaller than the leading flank angle makes it easier to be detached from a holder which is even expanded with cutting heat.

In Patent Document 2, in exchangeable tip cutting tool, it is described that, not only the shapes of the thread ridges are optimized to raise the strength, but also the head and the holder are fastened with tensile force which is larger than compressive force.

In Patent Document 3, a high strength bolt, which is excellent in fracture characteristic, is described. The high strength bolt has asymmetry shaped threads with different flank angles on the right and the left of the thread ridges, and the pressure flank angle is between 40° and 60°.

In Patent Document 4, a male thread member of which angle of inclination of a side surface, on which the load is applied at least when fastened, to the surface perpendicular to the central axis is 60° and/or more and is less than 90° is described.

PRIOR ART DOCUMENTS

Patent Documents

[Patent Document 1] JP-A-2010-284752
[Patent Document 2] JP-A-2007-290120
[Patent Document 3] JP-A-1996-177831
[Patent Document 4] JP-U-1992-77017

SUMMARY OF THE INVENTION

Problems to be Solved by the Invention

In recent years, highly efficient machining is desired in parts machining or die machining. This is the same for the exchangeable tip cutting tools and the requirement is increasing every year. Although feed rate and depth of cut are raised in highly efficient machining, load applied onto cutting edges during cutting is generally increased. In the exchangeable tip tools, the load on the cutting edges by cutting is applied in the direction in which the thread of the machining head is tightened. This causes damage of the thread if the strength of the thread is insufficient and cannot bear the increased cutting load during cutting. Furthermore, the thread may be fractured if the machining head is screwed strongly when attaching to the holder. For this reason, it has been required to use a tool such as a torque wrench that can tighten threads with constant torque to control the tightening torque.

For the exchangeable tip cutting tool in Patent Document 1, it is proposed that the flank angle of the following flank is smaller than the flank angle of the leading flank so that the thread ridges are reinforced as compared to the thread ridges having symmetrical contour profile. In Patent Document 2, an exchangeable tip cutting tool having easily detachable thread profile, in which the angle of inclination of the leading flank is optimized, is proposed. However, for the exchangeable tip cutting tools in Patent Document 1 and 2, ensuring enough strength against the tightening torque, which is an object of the present invention, is insufficient and thread ridges may fracture in highly efficient machining. Particularly, if the inclination angle of the following flank is designed to be small, then the strength at the tips of spirally shaped thread ridges, with only chamfering, is insufficient and there have been many cases in which the tips alone fracture.

In Patent Document 3, the high strength bolt, which is excellent in fracture characteristic, is proposed. The thread ridges of the high strength bolt are optimally designed and the tensile strength is improved. However, if the thread shape of Patent Document 3 is applied to an exchangeable tip cutting tool, the strength against the tension may be improved but ensuring enough strength against the tightening torque, which is an object of the present invention, is insufficient because the load is always applied in the direction in which the thread is tightened during cutting. For this reason, the thread ridges may fracture in highly efficient machining.

For the thread ridges in Patent Document 4, the accuracy of centering is improved by setting the inclination angle of the pressure surface of the thread at 60° and/or more and less than 90°. However, since it is weak against the force in the tensile direction generated during cutting, the machining head may be detached or the thread ridges may fracture under the influence of chattering vibration.

The present invention was achieved in view of such problems. Its object is to provide an exchangeable tip cutting tool in which breakage of threaded section and thread ridges is suppressed not only when attaching the machining head but also when the cutting load is increased during cutting so that highly efficient machining is possible. It is also an object of the present invention to provide a machining head and a holder to be used in the exchangeable tip cutting tool.

Means for Solving Problems

To achieve the above object, various thread-ridge shapes are examined to find the optimal thread-ridge shape by repeatedly testing cutting and measuring tightening torque. As a result, it is found that, to solve the above problems regarding the cutting by exchangeable tip cutting tools, it is important to make the flank angle of the following flank surface and the flank angle of the leading flank surface to be new and different from the thread shapes of conventional exchangeable tip cutting tools.

That is, the present invention provides a machining head comprising a cutting edge section at the tip thereof, a male threaded fastening section at the rear of the cutting edge section in an axial direction, which is to be screwed to a holder provided with a female threaded fastening section, and a notch provided between the cutting edge section and the male threaded fastening section, which is to be attached to the holder. A thread ridge of the male threaded fastening section comprises a flank surface of the pressure flank, a flank surface of the clearance flank, and a crest surface and a root surface connecting two types of flank surfaces. The flank angle of the pressure flank is provided to be larger than the flank angle of the clearance flank.

For the machining head of the present invention, it is preferable that the flank angle of the pressure flank is larger in the range between 10° and 60° than the flank angle of the clearance flank.

For the machining head of the present invention, it is preferable that the flank angle of the pressure flank is between 35° and 60°, the flank angle of the clearance flank is between 0° and 25°, one pitch of a thread ridge is between 15% and 30% of the nominal diameter of the male threaded fastening section, and each of the widths of the crest surface and the root surface connecting the two types of flank surfaces is between 15% and 30% of one pitch of a thread ridge when viewed from the direction perpendicular to the tool axis. Also, it is preferable to provide a tapered part on the side of the notch of the male threaded fastening section so that the outer diameter of the tapered part decreases toward the tip of the male threaded fastening section.

The present invention also provides a holder provided with a female threaded fastening section to which the machining head provided with the male threaded fastening section is screwed. Corresponding to the flank surface of the pressure flank, the flank surface of the clearance flank, and the crest and the root surfaces connecting the two types of flank surfaces of the male threaded fastening section respectively, a thread ridge of the female threaded fastening section of the holder comprises a screwing surface of the pressure flank, a screwing surface of the clearance flank, and the crest and the root screwing surfaces connecting the two types of screwing surfaces. The angle of screwing surface of the pressure flank is provided to be larger than the angle of screwing surface of the clearance flank.

For the holder of the present invention, it is preferable that the angle of the screwing surface of the pressure flank is larger in the range between 10° and 60° than the angle of the screwing surface of the clearance flank.

For the holder of the present invention, it is preferable that angle of screwing surface of the pressure flank is between 35° and 60°, the angle of screwing surface of the clearance flank is between 0° and 25°, the pitch of a thread ridge is between 15% and 30% of the nominal diameter of the male threaded fastening section, and each of the width of the crest and the root screwing surfaces connecting the two types of screwing surfaces is between 15% and 30% of the pitch of a thread ridge when viewed from the direction perpendicular to the tool axis. Also, it is preferable to provide a tapered part on the side of the opening part of the female threaded fastening section so that the inner diameter of the tapered part increases toward the opening part of the female threaded fastening section.

Furthermore, the present invention provides an exchangeable tip cutting tool comprising a machining head which includes a cutting edge section at the tip thereof, a male threaded fastening section at the rear of the cutting edge section in an axial direction, which is to be screwed to a holder provided with a female threaded fastening section, and a notch provided between the cutting edge section and the male threaded fastening section, which is to be attached to the holder and a holder which includes a female threaded fastening section, is to be screwed to the machining head provided with the male threaded fastening section. A thread ridge of the male threaded fastening section of the machining head comprises a flank surface of the pressure flank, a flank surface of the clearance flank, and a crest surface and a root surface connecting two types of flank surfaces. The flank angle of the pressure flank is provided to be larger than the flank angle of the clearance flank. Corresponding to the flank surface of the pressure flank, the flank surface of the clearance flank, and the crest surface and the root surface connecting the two types of flank surfaces of the male threaded fastening section respectively, a thread ridge of the female threaded fastening section of the holder comprises a screwing surface of the pressure flank, a screwing surface of the clearance flank, and the crest and the root screwing surfaces connecting the two types of screwing surfaces. The angle of screwing surface of the pressure flank is provided to be larger than the angle of screwing surface of the clearance flank.

Preferably, the machining head of the exchangeable tip cutting tool of the present invention is made of cemented carbide and integrally molded from the tip thereof to the male threaded fastening section. Also, it is preferable to provide a tapered part on the side of the notch of the male threaded fastening section with the outer diameter of the tapered part being decreased toward the tip of the male threaded fastening section and a tapered part on the side of the opening part of the female threaded fastening section with the inner diameter of the tapered part being increased toward the opening part of the female threaded fastening section so that the tapered part of the machining head and the tapered part of the holder make surface contact and an end face of the notch and an end face of the holder make surface contact.

Effects of the Invention

By using the exchangeable tip cutting tool with the machining head of the present invention and the holder which is to be screwed to the machining head, the strength of fastened male threads improves and highly efficient cutting can be performed as compared to the conventional exchangeable tip cutting tools. In addition, the present invention can provide an exchangeable tip cutting tool that enables highly efficient cutting and allows the tool-life to extend since the strength of the thread ridges of the male and female threaded fastening sections is improved, suppressing the damage of the thread ridges due to chattering vibration.

In the exchangeable tip cutting tool of the present invention, the thread ridges of the male threaded fastening section of the machining head has the flank angle of the pressure flank larger than the flank angle of the clearance flank. Preferably, the flank angle of the pressure flank is larger in the range between 10° and 60° than the flank angle of the clearance flank. This allows the strength of the overall male threaded fastening section to improve against the tightening torque. Therefore, fracture or breakage of the male threaded fastening section does not occur during cutting even if the load applied in the tightening direction increases, enabling efficient machining which is 1.5 or more times as high as the conventional exchangeable tip cutting tools.

According to the exchangeable tip cutting tool of the present invention, by optimizing the shape of the thread ridges of the male threaded fastening section of the machining head, not only the strength of the overall male threaded fastening section but also the strength of individual thread ridge of the male threaded fastening section can be improved. Stable machining is possible without fracturing the thread ridges of the male threaded fastening section even if chattering vibration occurs. Particularly, the rigidity of the tip of the male threaded fastening section, which is at the rear end of the machining head, is improved, largely suppressing fracture due to the tightening torque during attaching the machining head. Therefore, since fracture at the tip of the male threaded fastening section due to the tightening torque during cutting is also largely suppressed, stable machining is possible and an exchangeable tip cutting tool that has a machining tool-life as 1.5 or more times as long as the conventional exchangeable tip cutting tools can be provided.

According to the exchangeable tip cutting tool of the present invention, since the flank angle of the pressure flank of the male threaded fastening section of the machining head is between 35° and 60°, the area of the pressure flank, i.e. the pressure surface, is large and the accuracy of centering is improved when screwing the machining head with the holder, allowing more stable cutting. Also, in the present invention, the tapered part of the machining head and the tapered part of the holder make surface contact and, also, the end face of the notch and the end face of the holder make surface contact. This makes the machining head and the holder being bound to each other at two surfaces. Therefore, the accuracy of centering is further improved, allowing more stable machining.

DETAILED DESCRIPTION OF THE PREFERRED EMBODIMENTS

Figure 1:
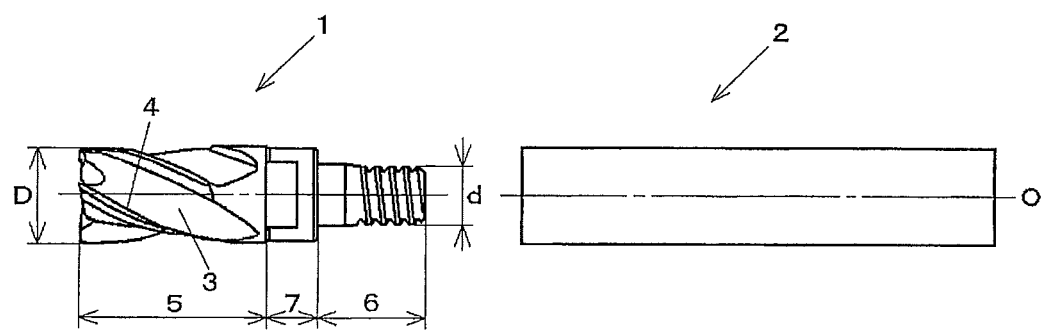
FIG. 1 is an overall schematic view of a machining head and a holder in accordance with an embodiment of the present invention.

Hereinafter, embodiments of the present invention will be described with reference to the drawings from FIG. 1 to FIG. 20. FIG. 1 is an overall schematic view of a machining head and a holder of the present invention. A machining head 1 is formed with a tool diameter D and has a chip space 3 for eliminating chips, cutting edge section 5 having four peripheral edges 4 on the outer surface at the tip, a male threaded fastening section 6 with a nominal diameter d at the rear end, and a notch 7 to be attached to the holder 2, which is provided between the cutting edge section 5 and the male threaded fastening section 6. The shape of the machining head 1 can be varied as necessary; ball end mill or radius end mill edges may be used for machining three dimensional shapes such as metal molds, and square end mill edges may be used for machining components requiring right angled parts. Also, multiple-edge type having six to ten edges may be used for cutting high-hardness materials and roughing end mill having wavy peripheral edges may be used for heavy cutting. Also, although it is preferable that the material for the machining head 1 is cemented carbide, commonly known material such as high-speed tool steel can be selected. Furthermore, although it is preferable that the machining head 1 is integrally formed from the tip to the male threaded fastening section, the cutting edge section 5, the male threaded fastening section 6, and the notch 7 may be manufactured separately as individual parts and then combined using technologies such as brazing.

Figure 2:
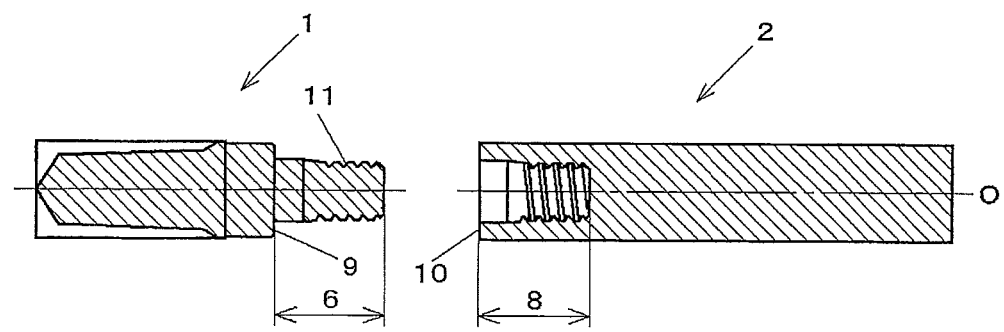
FIG. 2 is a sectional view of the machining head and the holder shown in FIG. 1 at the axial center.

FIG. 2 is a sectional view of the machining head and the holder shown in FIG. 1 at the axial center. The oblique lines in FIG. 2 indicate the cross section of the machining head and the holder at the axial center. A female threaded fastening section 8, which is to be fastened to the machining head 1, is provided at the tip of the holder 2.

When the machining head 1 is screwed to the holder 2 for attachment, since the thread ridges, namely the male threaded fastening section 6 and the female threaded fastening section 8, are in spiral forms, the machining head 1 proceeds toward the rear end, or to the right side of FIG. 2, and enters into the holder 2. As the threads enter, an end face 10 of the holder receives a bearing surface 9 of the machining head so that the machining head 1 and the holder 2 are fastened. At this moment, the male threaded fastening section 6 of the machining head 1 is entering but stopped by the bearing surface 9 of the machining head so that tension is produced between a flank surface of the pressure flank 11, which is a following flank of the thread ridge of the male threaded fastening section 6, and the bearing surface 9 making the machining head 1 and the holder 2 fastened firmly. If the shapes of male and female threaded fastening section of conventional exchangeable tip cutting tools are used, enormous tightening torque is applied when attaching the machining head to the holder or when tightening torque is increased in the cutting direction due to abrasion during cutting. This causes the tensile force to be increased and fracture or breakage may occur, particularly at the male threaded fastening section, due to lack of strength of the machining head.

If the holder 2 has a tapered part, steel (carbon steel, alloy steel, nickel-chromium steel, nickel chrome molybdenum steel, chromium steel, chrome molybdenum steel, manganese steel, or stainless steel) is preferable as material for the holder 2. If there is no tapered part, then it is preferable to use cemented carbide, though commonly known material such as high-speed tool steel may be selected as well. Also, the shape of the holder 2 may be varied as necessary like the machining head; a long holder or a holder having a tapered part at the neck may be used for deep depth cutting.

Figure 3:
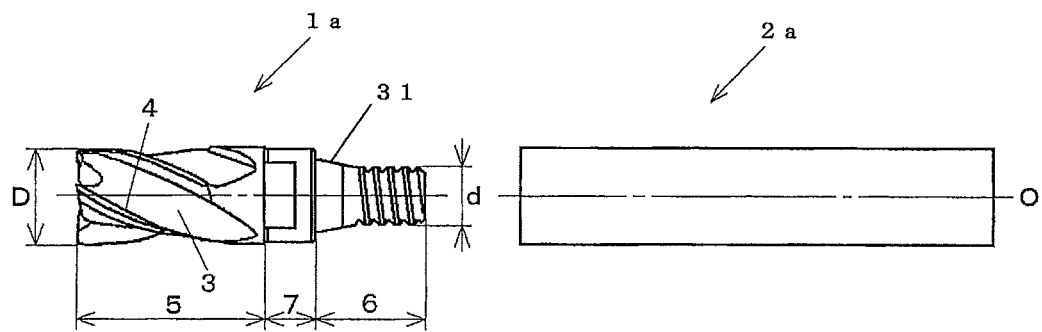
FIG. 3 is an overall schematic view of a machining head and a holder in accordance with another embodiment of the present invention.
Figure 4:
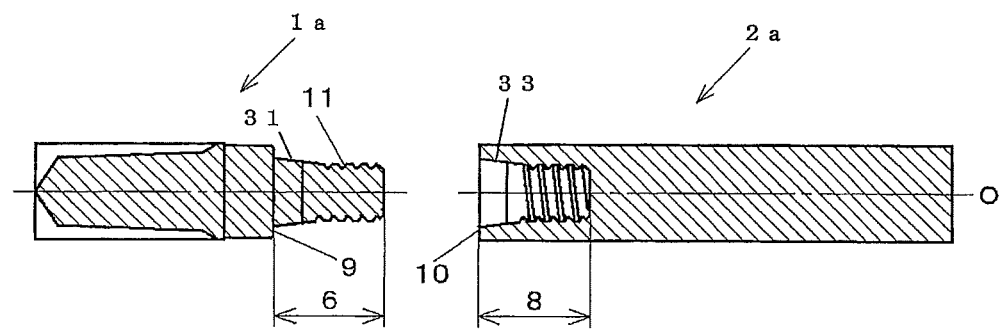
FIG. 4 is a sectional view of the machining head and the holder shown in FIG. 3 at the axial center.

FIG. 3 is an overall schematic view of a machining head 1a and a holder 2a and FIG. 4 is a sectional view of the machining head 1a and the holder 2a shown in FIG. 3 at the axial center. The machining head 1a and the holder 2a is configured similarly to the machining head 1 and the holder 2. However, tapered parts 31 and 33 are formed respectively. Hereinafter, same numerals will be used for the components similar to the machining head 1 and the holder 2, omitting redundant descriptions.

The tapered part 31 is provided on the side of the notch 7 of the male threaded fastening section 6 of the machining head 1a. The tapered part 31 is formed so that its outer diameter gradually decreases toward the tip of the male threaded fastening section 6. Also, the tapered part 33 is provided at the opening side of the female threaded fastening section 8 of the holder 2a. The tapered part 33 is formed so that its inner diameter gradually increases toward the opening side of the female threaded fastening section 8. The shapes (the taper angles) of the tapered part 31 and the tapered part 33 correspond to each other.

Figure 5:
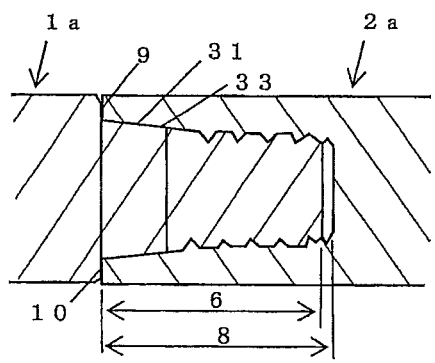
FIG. 5 is a partially enlarged view of the machining head shown in FIG. 3 being attached to the holder.

FIG. 5 is an enlarged sectional view of the machining head 1a being attached to the holder 2a by screwing the male threaded fastening section 6 of the machining head 1a and the female threaded fastening section 8 of the holder 2a together. When the male threaded fastening section 6 of the machining head 1a is screwed into the female threaded fastening section 8 of the holder 2a, first, the tapered part 31 comes into contact with the tapered part 33. At this time, the tapered part 31 and the tapered part 33 make surface contact since the tapered shapes of the tapered parts 31 and 33 correspond to each other. If the male threaded fastening section 6 is further screwed into the female threaded fastening section 8 from this state at a predetermined torque, the tapered part 33 of the holder 2a deforms slightly, widened by the tapered part 31. Therefore, in such a case, it is preferable to use a deformable material such as high-speed tool steel for the holder 2a.

In this way, by screwing the male threaded fastening section 6 into the female threaded fastening section 8 at the predetermined torque, the male threaded fastening section 6 can be tightened until the bearing surface 9 of the machining head 1a makes contact with the end face 10 of the holder 2a. At this time, the bearing surface 9 of the machining head 1a and the end face 10 of the holder 2a make surface contact. That is, when the attachment of the machining head 1a and the holder 2a is completed, the tapered parts 31 and 33 make surface contact as well as the bearing surface 9 and the end face 10 make surface contact. In this way, by making surface contact of the two surfaces in different directions, the positions of the machining head 1a and the holder 2a are bound to each other, further improving the accuracy of centering.

The taper angle of the tapered parts 31 and 33 (the angle formed with the tool axis) is preferably, for example, between 0.1° and 5.0°. It is difficult to gain an advantage of a tapered form if the taper angle is less than 0.1°. Also, if the taper angle is greater than 5.0°, it is difficult to deform the holder 2a when the machining head 1a is screwed, making two-surfaced bounding difficult. For this reason, it is preferable to use the machining head 1a and the holder 2a having the predetermined tapered parts 31 and 33 in the present invention.

Figure 6:
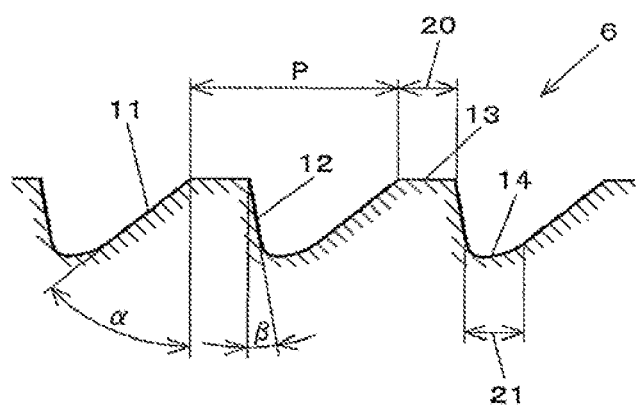
FIG. 6 is an enlarged view of a male threaded fastening section of the machining head in accordance with an embodiment of the present invention shown in FIG. 1.

FIG. 6 is an enlarged view of the male threaded fastening section of the machining head of the present invention shown in FIG. 1 and FIG. 3. The oblique lines in FIG. 6 indicate the cross section of the male threaded fastening section 6 at the axial center. A thread ridge of the male threaded fastening section 6 of the machining head of the present invention comprises a flank surface of the pressure flank 11, a flank surface of the clearance flank 12, and a crest surface 13 and a root surface 14 connecting two types of flank surfaces 11 and 12. On the cross section at the axial center of the male threaded fastening section 6 in accordance with an embodiment of the present invention, a flank angle α of the pressure flank, which is the angle between the flank surface of the pressure flank 11 and the line perpendicular to a tool axis O, is designed to be greater than a flank angle β of the clearance flank, which is the angle between the flank surface of the clearance flank 12 and the line perpendicular to the tool axis O. The length of one of the thread ridges measured parallel to the tool axis O is equal to one pitch P of the thread ridge.

Figure 7:
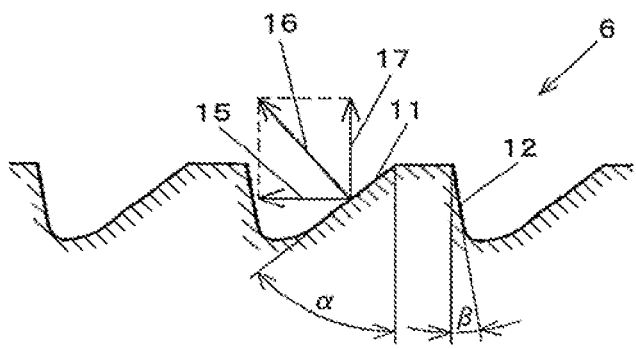
FIG. 7 shows magnitude of force occurring on a thread ridge of the male threaded fastening section.

FIG. 7 shows magnitude of force occurring on a thread ridge of the male threaded fastening section. The oblique lines in FIG. 7 indicate the cross section of the male threaded fastening section 6 at the axial center. When the machining head is fastened with the holder, force 16 is applied on the flank surface of the pressure flank in the direction perpendicular to the flank surface of the pressure flank 11. If the flank angle α of the pressure flank is greater than the flank angle β of the clearance flank, force 17 that is dispersed in the direction perpendicular to the tool axis O from the force 16 applied on the flank surface of the pressure flank is large. Therefore, tension 15 applied in the direction of the tool axis O is small even if tightening torque is applied during cutting. Thus, since it is possible in the present invention to make the tension 15 small, fracture or breakage of the male threaded fastening section 6 can be suppressed even when enormous tightening torque is applied during cutting or attaching the machining head to the holder.

Figure 8:
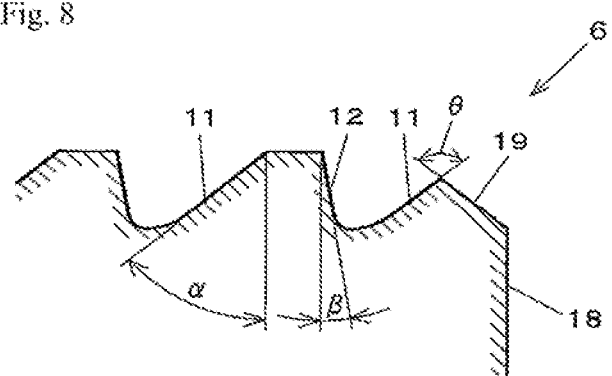
FIG. 8 is an enlarged view showing a vicinity of the rear end of the machining head in accordance with an embodiment of the present invention.

FIG. 8 is an enlarged view showing a vicinity of the rear end of the machining head of the present invention. The oblique lines in FIG. 8 indicate the cross section of the male threaded fastening section 6 at the axial center. Since the thread ridges are in spiral forms, the thread ridge of the male threaded fastening section 6 at the rear end of the machining head gradually comes over from the flank surface of the clearance flank 12 toward an end face 18 of the machining head. Thus, the thread ridge of the male threaded fastening section 6 at the rear end of the machining head is formed with the flank surface of the pressure flank 11 and the end face 18 of the machining head, making the rigidity of the thread ridges inferior. Usually, the rear end of the machining head is chamfered to ensure the strength of the thread ridges. However, unlike the conventional technologies, the flank angle α of the pressure flank is greater than the flank angle β of the clearance flank in the present invention. For this reason, angle θ between a surface 19 formed by chamfering and the flank surface of the pressure flank 11 is large. As a result, the rigidity at the tip of the male threaded fastening section 6, which is at the rear end of the machining head, is improved and fracture is suppressed.

Figure 9:
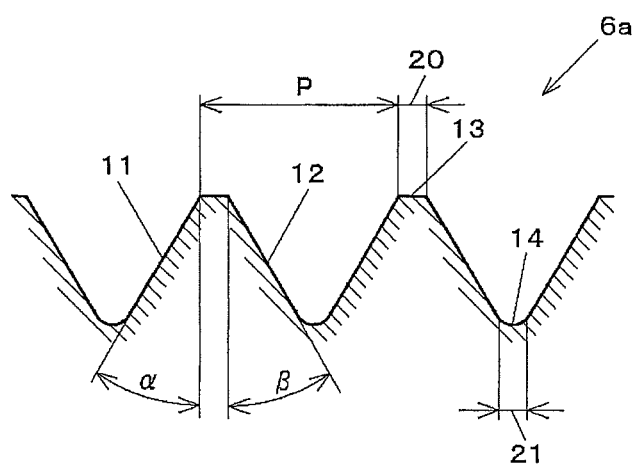
FIG. 9 is an enlarged view of thread ridges of a male threaded fastening section of a machining head of a conventional exchangeable tip cutting tool in which a metric coarse screw thread is used.

FIG. 9 is an enlargement view of thread ridges of a male threaded fastening section of a machining head of a conventional exchangeable tip cutting tool in which a metric coarse screw thread is used. The oblique lines in FIG. 9 indicate the cross section of the male threaded fastening section 6a at the axial center, which is a metric coarse screw thread. The metric coarse screw thread is standardized by JIS (Japanese Industrial Standards). The metric coarse screw thread of the male threaded fastening section 6 has a symmetrical thread shape with the flank angle α of the pressure flank and the flank angle β of the clearance flank both of which are 30°. The thread ridge of the metric coarse screw thread of the male threaded fastening section 6 includes the flank surface of the pressure flank 11, the flank surface of the clearance flank 12, and the crest surface 13 and the root surface 14 connecting the two types of flank surfaces 11 and 12 in one pitch P.

Figure 10:
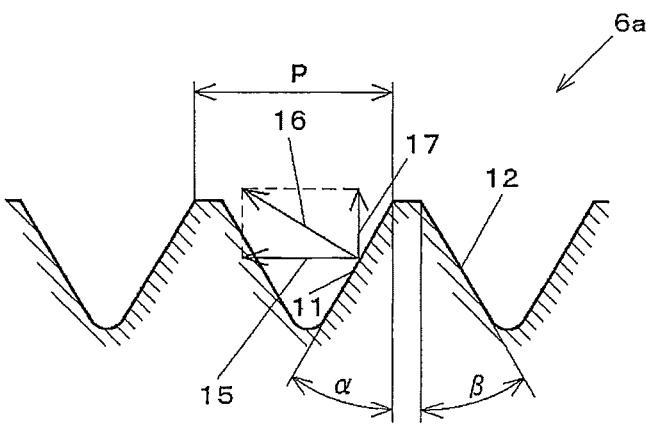
FIG. 10 shows magnitude of force occurring on a thread ridge of the metric coarse screw thread.

FIG. 10 shows magnitude of force occurring on the thread ridge of the metric coarse screw thread. The oblique lines in FIG. 10 indicate the cross section of the male threaded fastening section 6a at the axial center, which is a metric coarse screw thread. When the machining head is fastened with the holder, the force 16 is applied on the flank surface of the pressure flank in the direction perpendicular to the flank surface of the pressure flank 11. For the thread with a predetermined pitch P standardized pitch P), such as a metric coarse screw thread, if the thread has a symmetrical shape and the flank angle α of the pressure flank is equal to the flank angle β of the clearance flank, it is impossible to make the flank angle α of the pressure flank larger. Therefore, the force 17 that is dispersed from the force 16, which is applied on the flank surface of the pressure flank when fastening the thread, in the direction perpendicular to the tool axis O is smaller. Also, if tightening torque is applied during cutting, the tension 15 applied in the direction of the tool axis O becomes large. Thus, it is likely that fracture or breakage occurs at the male threaded fastening section 6a which is the metric coarse screw thread. If the flank angle α of the pressure flank is made larger to increase the force 17 dispersed in the direction perpendicular to the tool axis O, there still is a problem because one pitch P, that is the length of a thread ridge, becomes longer resulting in an increase in the manufacturing cost.

Figure 11:
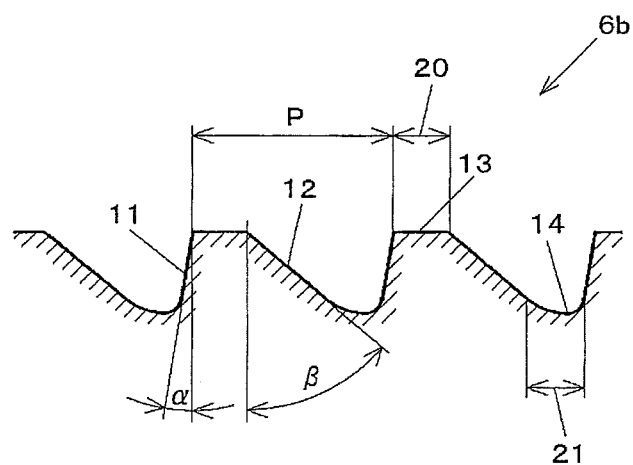
FIG. 11 is an enlarged view of a male threaded fastening section of a conventional machining head described in Patent Document 1.

FIG. 11 is an enlarged view of a male threaded fastening section of a conventional machining head described in Patent Document 1. The oblique lines in FIG. 11 indicate the cross section of the male threaded fastening section 6b in Patent Document 1 at the axial center. The thread ridge of the male threaded fastening section 6b includes the flank surface of the pressure flank 11, the flank surface of the clearance flank 12, and the crest surface 13 and the root surface 14 connecting the two types of flank surfaces 11 and 12. Unlike the present invention, the male threaded fastening section 6b of the conventional machining head described in Patent Document 1 has the flank angle α of the pressure flank which is designed to be smaller than the flank angle β of the clearance flank.

Figure 12:
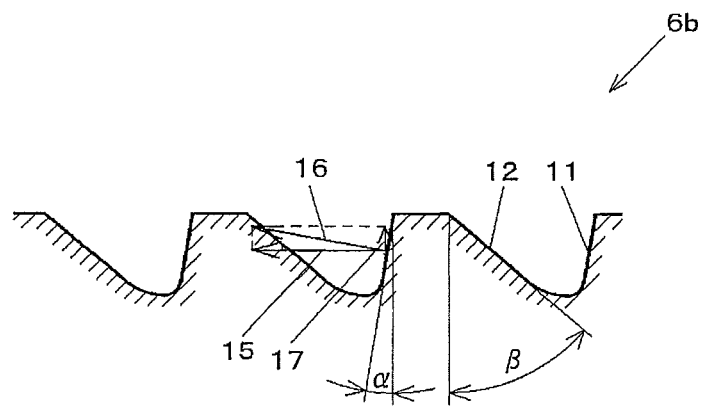
FIG. 12 shows magnitude of force occurring on a thread ridge of the male threaded fastening section described in Patent Document 1.

FIG. 12 shows magnitude of force occurring on a thread ridge of the male threaded fastening section described in Patent Document 1. The oblique lines in FIG. 12 indicate the cross section of the male threaded fastening section 6b in Patent Document 1 at the axial center. When the machining head is fastened with the holder, the force 16 is applied on the flank surface of the pressure flank in the direction perpendicular to the flank surface of the pressure flank 11. For the conventional male threaded fastening section 6b described in Patent Document 1, the flank angle α of the pressure flank is smaller than the flank angle β of the clearance flank. Therefore, the force 17 that is dispersed in the direction perpendicular to the tool axis O from the force 16 applied on the flank surface of the pressure flank becomes small and the tension 15 applied in the direction of the tool axis O becomes large if tightening torque is applied during cutting. Because of this, fracture or breakage of the threaded section is likely to occur. Here, all of the force 16 applied on the flank surface of the pressure flank drawn in FIGS. 7, 10, and 12 has equal value of force.

Figure 13:
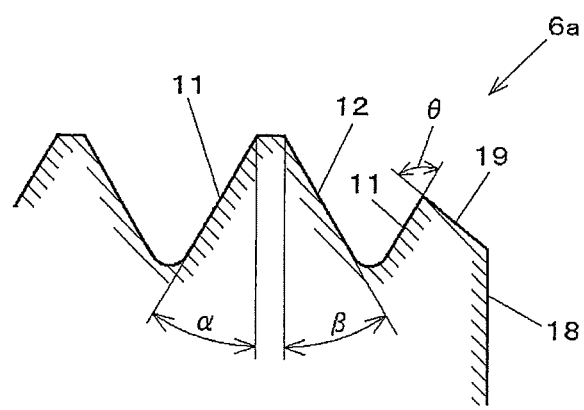
FIG. 13 is an enlarged view showing a vicinity of the rear end of a machining head of a conventional exchangeable tip cutting tool.
Figure 14:
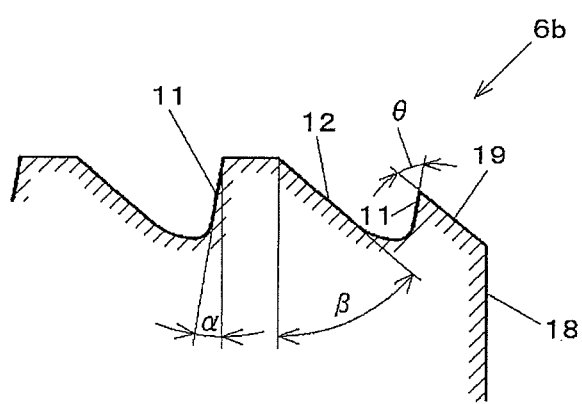
FIG. 14 is an enlarged view showing a vicinity of the rear end of a machining head of the exchangeable tip cutting tool described in Patent Document 1.

FIG. 13 is an enlarged view showing a vicinity of the rear end of a machining head of a conventional exchangeable tip cutting tool. FIG. 14 is an enlarged view showing a vicinity of the rear end of a machining head of the exchangeable tip cutting tool described in Patent Document 1. The oblique lines in FIGS. 13 and 14 indicate the cross section of the male threaded fastening section 6a and 6b at the axial center respectively. Since the thread ridges are in spiral forms, the thread ridge of the male threaded fastening section 6a, 6b at the rear end of the machining head gradually comes over from the flank surface of the clearance flank 12 toward an end face 18 of the machining head. Thus, the thread ridge of the male threaded fastening section 6a, 6b at the rear end of the machining head is formed with the flank surface of the pressure flank 11 and the end face 18 of the machining head, making the rigidity of the thread ridges inferior. Usually, the rear end of the machining head is chamfered to ensure the strength of the thread ridges. However, for the machining head of the conventional exchangeable tip cutting tool, the flank angle α of the pressure flank is smaller than, or equal to, the flank angle β of the clearance flank. For this reason, the angle θ between the surface 19 formed by chamfering and the flank surface of the pressure flank 11 is small. As a result, fracture may occur due to the lack of rigidity at the tip of the male threaded fastening section 6a, 6b which is at the rear end of the machining head.

For the machining head of the present invention, it is preferable that the flank angle α of the pressure flank is larger in the range between 10° and 60° than the flank angle β of the clearance flank. If the value of one pitch of the thread is the predetermined pitch P (i.e. standardized pitch P), the strength of the thread ridges of the male threaded fastening section can be increased by making the flank angle α of the pressure flank larger than the flank angle β of the clearance flank by 10° or more. Also, the force applied on the flank surface of the pressure flank due to tightening torque can be dispersed more toward the direction perpendicular to the tool axis O. Therefore, fracture or breakage of the male threaded fastening section can be suppressed further even when enormous tightening torque due to abrasion and the like is applied during cutting or attaching the machining head to the holder. If the flank angle α of the pressure flank is larger than the flank angle β of the clearance flank by more than 60°, the load on the cutting edge section during cutting is applied in the direction so to make the machining head to be detached and vibration may tend to occur. For this reason, it is preferred that the flank angle α of the pressure flank is larger in the range less than 60° than the flank angle β of the clearance flank. Also, it is particularly preferable that the flank angle α of the pressure flank is larger in the range between 20° and 50° than the flank angle β of the clearance flank.

Setting the flank angle α of the pressure flank to be 35° or more enables to disperse more force, which is applied on the flank surface of the pressure flank when fastening the machining head and the holder together, toward the direction perpendicular to the tool axis O. Therefore, the tension in the direction of the tool axis O becomes small, enabling to suppress fracture or breakage of the male threaded fastening section. Also, although spigot joint portion or the like is usually provided to improve the accuracy of centering for fastening the machining head with the holder, the accuracy of centering for fastening the machining head can be further improved if the flank angle α of the pressure flank is set at 35° or more. Therefore, it is preferred that the flank angle α of the pressure flank is 35° or more. Also, if the flank angle α of the pressure flank is more than 60°, the load on the cutting edge section during cutting is applied in the direction so to make the machining head to be detached and vibration may tend to occur. For this reason, it is preferred that the flank angle α of the pressure flank is 60° or less. Therefore, preferably, the flank angle α of the pressure flank is in the range between 35° and 60°.

If the flank angle β of the clearance flank is more than 25°, one pitch P of the thread ridge becomes larger and the length of the male threaded fastening section becomes longer, which leads to a problem of high manufacturing cost. Hence, the flank angle β of the clearance flank is preferred to be in the range between 0° and 25°.

If one pitch P of the thread ridge is smaller than 15% of the nominal diameter d of the male threaded fastening section, the rigidity of the thread ridge of the male threaded fastening section becomes inferior. Also, if one pitch P of the thread ridge is larger than 30% of the nominal diameter d of the male threaded fastening section, the length of the male threaded fastening section becomes longer, which leads to a problem of high manufacturing cost. Therefore, one pitch P of the thread ridge is preferred to be in the range between 15% and 30% of the nominal diameter d of the male threaded fastening section.

As shown in FIG. 6, a crest surface width 20 and a root surface width 21 are the widths of the crest surface 13 and the root surface 14 connecting the two types of flank surfaces 11, 12 respectively. If the crest surface width 20 and the root surface width 21, both measured in the direction parallel to the tool axis, are smaller than 15% of one pitch P of the thread ridge, the rigidity of the crest of the male threaded fastening section 6 becomes inferior. Also, if the crest surface width 20 and the root surface width 21, both measured in the direction parallel to the tool axis, are larger than 30% of one pitch P of the thread ridge, the flank surface becomes smaller. For this reason, the load on the cutting edge section is applied in the direction so to make the machining head to be detached and vibration may tend to occur. Therefore, the crest surface width 20 and the root surface width 21, which are the widths of the crest surface 13 and the root surface 14 connecting the two types of flank surfaces 11, 12 respectively and both measured in the direction parallel to the tool axis, are preferably in the range between 15% and 30% of one pitch P of the thread ridge.

Figure 15:
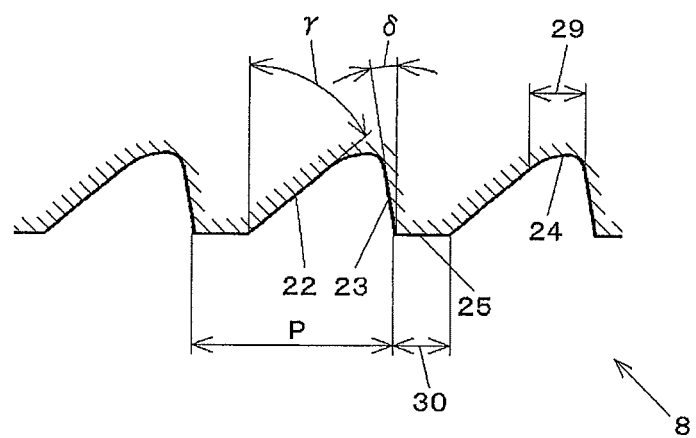
FIG. 15 is an enlarged view of a female threaded fastening section of the holder shown in FIG. 2.

FIG. 15 is an enlarged view of a female threaded fastening section of the holder shown in FIG. 2 and FIG. 4. The oblique lines in FIG. 15 indicate the cross section of the female threaded fastening section 8 at the axial center. Corresponding to flank surface of the pressure flank, the flank surface of the clearance flank, and the crest surface and the root surface connecting the two types of flank surfaces respectively that are provided on the male threaded fastening section, one pitch P of the thread ridge of the female threaded fastening section 8 comprises a screwing surface of the pressure flank 22, a screwing surface of the clearance flank 23, and the crest and the root screwing surfaces 24, 25 connecting the two types of screwing surfaces 22, 23. On the cross section at the axial center of the female threaded fastening section 8 in accordance with an embodiment of the present invention, an angle γ of the screwing surface of the pressure flank, which is the angle between the screwing surface of the pressure flank 22 and the line perpendicular to the tool axis O, is designed to be greater than an angle δ of the screwing surface of the clearance flank, which is the angle between the screwing surface of the clearance flank 23 and the line perpendicular to the tool axis O. For the female threaded fastening section 8, like the male threaded fastening section 6, the length of one of the thread ridges measured parallel to the tool axis O is equal to one pitch P of the thread ridge.

Figure 16:
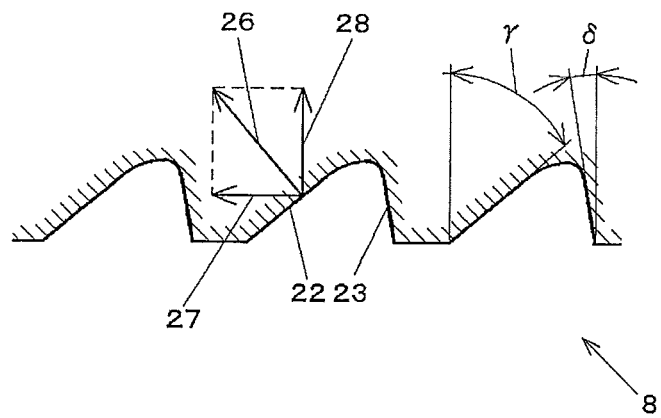
FIG. 16 shows magnitude of force occurring on a thread ridge of the female threaded fastening section in accordance with an embodiment of the present invention.

FIG. 16 shows magnitude of force occurring on a thread ridge of the female threaded fastening section in accordance with an embodiment of the present invention. The oblique lines in FIG. 16 indicate the cross section of the female threaded fastening section 8 at the axial center. When the machining head is fastened with the holder, force 26 is applied in the direction perpendicular to the screwing surface of the pressure flank 22. If the angle γ of the screwing surface of the pressure flank is greater than the angle δ of the screwing surface of the clearance flank, force 28 that is dispersed in the direction perpendicular to the tool axis O from the force 26 which is applied on the screwing surface of the pressure flank 22 is large. Therefore, tension 27 applied in the direction of the tool axis O is small even if tightening torque is applied during cutting. Thus, fracture or breakage of the female threaded fastening section 8 can be suppressed even when enormous tightening torque is applied during cutting or attaching the machining head to the holder.

Figure 17:
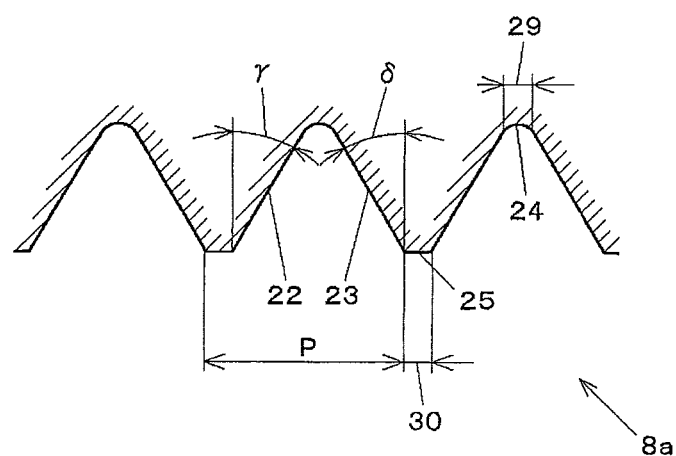
FIG. 17 is an enlarged view of thread ridges of a female threaded fastening section of a machining head of a conventional exchangeable tip cutting tool in which a metric coarse screw thread is used.

FIG. 17 is an enlarged view of thread-ridges of a female threaded fastening section of a machining head of a conventional exchangeable tip cutting tool in which a metric coarse screw thread is used. The oblique lines in FIG. 17 indicate the cross section of the female threaded fastening section 8a at the axial center, which is a metric coarse screw thread. For the female threaded fastening section 8, the metric coarse screw thread is also standardized by JIS. The metric coarse screw thread of the female threaded fastening section 8a has a symmetrical thread shape and both the angle γ of the screwing surface of the pressure flank and the angle δ of the screwing surface of the clearance flank are 30°. The thread ridge of the metric coarse screw thread of the female threaded fastening section 8a includes the screwing surface of the pressure flank 22, the screwing surface of the clearance flank 23, and the crest screwing surface 24 and the root screwing surface 25 connecting the two types of the screwing surfaces in one pitch P.

Figure 18:
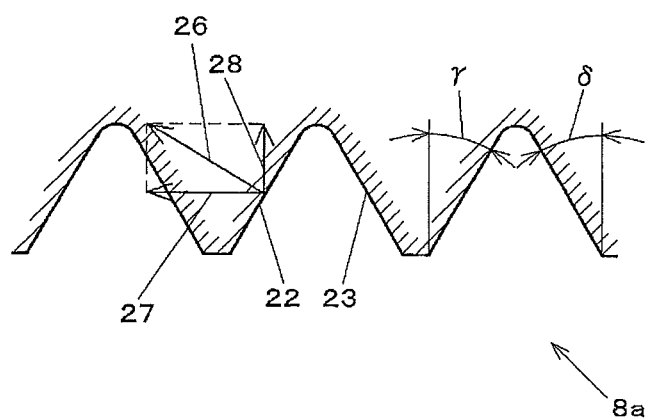
FIG. 18 shows magnitude of force occurring on a thread ridge of the metric coarse screw thread of the female threaded fastening section.

FIG. 18 shows magnitude of force occurring on the thread ridge of the female threaded fastening section which is a metric coarse screw thread. The oblique lines in FIG. 18 indicate the cross section of the female threaded fastening section 8a at the axial center, which is a metric coarse screw thread. When the machining head is fastened with the holder, the force 26 is applied on the screwing surface of the pressure flank in the direction perpendicular to the screwing surface of the pressure flank 22. For the thread with a predetermined pitch P (i.e. standardized pitch P), such as a metric coarse screw thread, if the thread has a symmetrical shape and the angle γ of the screwing surface of the pressure flank is equal to the angle δ of the screwing surface of the clearance flank, it is impossible to make the angle γ of the screwing surface of the pressure flank larger. Therefore, the force 28 that is dispersed in the direction perpendicular to the tool axis O from the force 26, which is applied on the screwing surface of the pressure flank when fastening the thread, is smaller. Also, if tightening torque is applied during cutting, the tension 27 applied in the direction of the tool axis O becomes large. Thus, it is likely that fracture or breakage occurs at the female threaded fastening section 8a which is the metric coarse screw thread. If the angle γ of the screwing surface of the pressure flank is made larger to increase the force 28 dispersed in the direction perpendicular to the tool axis O, there still is a problem because one pitch P, that is the length of the thread, becomes longer resulting in an increase in the manufacturing cost.

Figure 19:
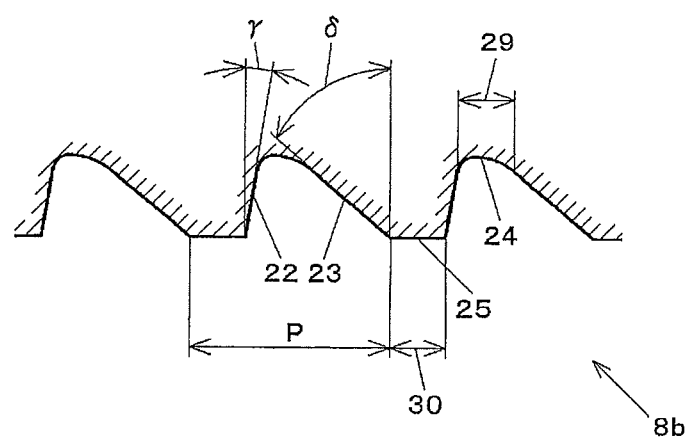
FIG. 19 is an enlarged view of a female threaded fastening section of a conventional holder that is to be screwed to the machining head described in Patent Document 1.

FIG. 19 is an enlarged view of a female threaded fastening section of a conventional holder that is to be screwed to the machining head described in Patent Document 1. The oblique lines in FIG. 19 indicate the cross section of the female threaded fastening section 8b in Patent Document 1 at the axial center. The thread ridge of the female threaded fastening section 8b in Patent Document 1 includes, in one pitch P of the thread, the screwing surface of the pressure flank 22, the screwing surface of the clearance flank 23, and the crest and the root screwing surfaces 24 and 25 connecting the two types of screwing surfaces 22, 23. The angle γ of the screwing surface of the pressure flank is designed to be smaller than the angle δ of the screwing surface of the clearance flank.

Figure 20:
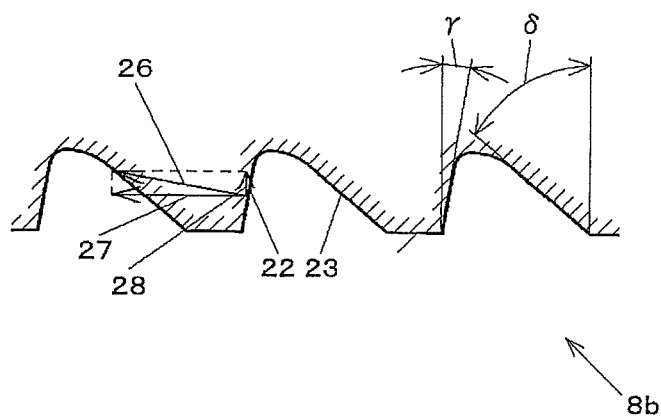
FIG. 20 shows magnitude of force occurring on a thread ridge of the female threaded fastening section described in Patent Document 1.

FIG. 20 shows magnitude of force occurring on a thread ridge of the female threaded fastening section described in Patent Document 1. The oblique lines in FIG. 20 indicate the cross section of the female threaded fastening section 8b in Patent Document 1 at the axial center. When the machining head is fastened with the holder, the force 26 is applied on the screwing surface of the pressure flank in the direction perpendicular to the screwing surface of the pressure flank 22. If the angle γ of the screwing surface of the pressure flank is smaller than the angle δ of the screwing surface of the clearance flank as in the female threaded fastening section 8b described in Patent Document 1, the force 28 that is dispersed in the direction perpendicular to the tool axis O from the force 26, which is applied on the screwing surface of the pressure flank, becomes small. Also, the tension 27 applied in the direction of the tool axis O becomes large if tightening torque is applied during cutting. Because of this, fracture or breakage of the female threaded section 8b in Patent Document 1 is likely to occur due to enormous tightening torque applied or due to abrasion during attaching the machining head or cutting.

For the holder of the present invention, it is preferable that the angle γ of the screwing surface of the pressure flank is larger in the range between 10° and 60° than the angle δ of the screwing surface of the clearance flank. The strength of the thread ridges of the female threaded fastening section 8 can be increased by making the angle γ of the screwing surface of the pressure flank larger than the angle δ of the screwing surface of the clearance flank by 10° or more. Also, the force 26 applied on the screwing surface of the pressure flank due to tightening torque can be dispersed more toward the direction perpendicular to the tool axis O. Therefore, fracture or breakage of the male threaded fastening section can be suppressed further even when enormous tightening torque due to abrasion and the like is applied during cutting or attaching the machining head to the holder. If the angle γ of the screwing surface of the pressure flank is larger than the angle δ of the screwing surface of the clearance flank by more than 60°, the load on the cutting edge section during cutting is applied in the direction so to make the machining head to be detached and vibration may tend to occur. For this reason, it is preferred that the angle γ of the screwing surface of the pressure flank is larger in the range less than 60° than the angle δ of the screwing surface of the clearance flank. Also, it is particularly preferable that the angle γ of the screwing surface of the pressure flank is larger in the range between 20° and 50° than the angle δ of the screwing surface of the clearance flank.

Setting the angle γ of the screwing surface of the pressure flank to be 35° or more enables to disperse more force 26, which is applied on the screwing surface of the pressure flank when fastening the machining head and the holder together, toward the direction perpendicular to the tool axis O. Therefore, the tension 27 in the direction of the tool axis O becomes small, enabling to suppress fracture or breakage of the female threaded fastening section 8. Also, although spigot joint portion or the like is usually provided to improve the accuracy of centering for fastening the machining head with the holder, the accuracy of centering for fastening the machining head can be further improved if the angle γ of the screwing surface of the pressure flank is 35° or more. Therefore, it is preferred that the angle γ of the screwing surface of the pressure flank is 35° or more. Also, if the angle γ of the screwing surface of the pressure flank is more than 60°, the load on the cutting edge section during cutting is applied in the direction so to make the machining head to be detached and vibration may tend to occur. For this reason, it is preferred that the angle γ of the screwing surface of the pressure flank is 60° or less. Therefore, preferably, the angle γ of the screwing surface of the pressure flank is in the range between 35° and 60°.

If the angle δ of the screwing surface of the clearance flank is more than 25°, one pitch P of the thread ridge becomes excessively large and the length of the female threaded fastening section 8 becomes long beyond the permissible range, which leads to a problem of high manufacturing cost. Hence, the angle δ of the screwing surface of the clearance flank is preferred to be in the range between 0° and 25°.

If one pitch P of the thread ridge is smaller than 15% of the nominal diameter d of the male threaded fastening section, the rigidity of the thread ridge becomes inferior. Also, if one pitch P of the thread ridge is larger than 30% of the nominal diameter d of the male threaded fastening section, the length of the female threaded fastening section 8 becomes long beyond the permissible range, which leads to a problem of high manufacturing cost. Therefore, one pitch P of the thread ridge is preferred to be in the range between 15% and 30% of the nominal diameter d of the male threaded fastening section.

As shown in FIG. 15, a crest screwing surface width 29 and a root screwing surface width 30 are the widths of the crest screwing surface 24 and the root screwing surface 25 connecting the two types of screwing surfaces 22, 23 respectively. If the crest screwing surface width 29 and the root screwing surface width 30 both measured in the direction parallel to the tool axis are smaller than 15% of one pitch P of the thread ridge, the rigidity of the crest of the thread ridge becomes inferior. Also, if the crest screwing surface width 29 and the root screwing surface width 30 both measured in the direction parallel to the tool axis are larger than 30% of one pitch P of the thread ridge, the screwing surface of the flank surface becomes smaller. For this reason, the load on the cutting edge section is applied in the direction so to make the machining head to be detached and vibration may tend to occur. Therefore, the crest screwing surface width 29 and the root screwing surface width 30, which are the widths of the crest screwing surface 24 and the root screwing surface 25 connecting the two types of screwing surfaces 22, 23 respectively and both measured in the direction parallel to the tool axis, are preferably in the range between 15% and 30% of one pitch P of the thread ridge.

The exchangeable tip cutting tool of the present invention can be manufactured by fastening the machining head of the present invention with the holder of the present invention described above. Since the rigidity of the male and the female fastening sections of the machining head and the holder of the present invention is improved compared to the conventional ones, the fracture of the male and the female fastening sections can be suppressed during manufacturing the exchangeable tip cutting tool of the present invention even when screwed very tightly. However, when screwing the machining head to the holder, it is preferable to use a torque wrench to maintain the constant tightening torque.

The maximum effect of the present invention can be obtained, but not particularly limited, when the taper angle determined by the angle between the crest surface and the tool axis O when viewed at the cross section at the axial center is 0°. However, almost the same effect can be obtained in a case in which a minute taper angle in the range between more than 0° and 1° is provided.

Although the present invention will be described in detail below by giving Examples, the technical scope of the present invention is not limited to the embodiments described.

EXAMPLES

Example 1

To compare the rigidity of the male and the female fastening sections with different shapes of the threads, the following exchangeable tip cutting tools of Reference example 1 of the present invention, Conventional Example 1, and Comparative Example 1 are prepared and cutting is evaluated.

For Reference example 1 of the present invention, a machining head with a male threaded fastening section wherein a flank angle α of the pressure flank is 50°, a flank angle β of the clearance flank is 10°, one pitch P of the thread ridge is 1.5 mm, the crest surface width is 0.408 mm, and the root surface width is 0.408 mm is manufactured. Further, a holder with a female threaded fastening section wherein an angle γ of the screwing surface of the pressure flank is 50°, an angle δ of the screwing surface of the clearance flank is 10°, one pitch P of the thread ridge is 1.5 mm, the crest screwing surface width is 0.408 mm, and the root screwing surface width is 0.408 mm is manufactured. An exchangeable tip cutting tool of Reference example 1 of the present invention is manufactured by screwing this machining head to the holder. That is, the exchangeable tip cutting tool of Reference example 1 of the present invention manufactured has the machining head provided with the flank angle α of the pressure flank that is 40° larger than the flank angle β of the clearance flank and the holder provided with the angle γ of the screwing surface of the pressure flank that is 40° larger than the angle δ of the screwing surface of the clearance flank.

For Conventional Example 1, a machining head with a male threaded fastening section and a holder with a female threaded fastening section, in which the thread ridges are metric coarse screw threads listed in JIS standard, are manufactured. An exchangeable tip cutting tool for the Conventional Example 1 is manufactured by screwing this machining head to the holder. In the machining head used in the exchangeable tip cutting tool of the Conventional Example 1, a flank angle α of the pressure flank is 30°, a flank angle β of the clearance flank is 30°, one pitch P of the thread ridge is 1.0 mm, the crest surface width is 0.211 mm, and the root surface width is 0.211 mm. In the holder used in the exchangeable tip cutting tool of the Conventional Example 1, an angle γ of the screwing surface of the pressure flank is 30°, an angle δ of the screwing surface of the clearance flank is 30°, one pitch P of the thread ridge is 1.0 mm, the crest screwing surface width is 0.211 mm, and the root screwing surface width is 0.211 mm. That is, the exchangeable tip cutting tool of Conventional Example 1 manufactured has the machining head provided with the flank angle α of the pressure flank which is equal to the flank angle β of the clearance flank and the holder provided with the angle γ of the screwing surface of the pressure flank which is equal to the angle δ of the screwing surface of the clearance flank.

For Comparative Example 1, a machining head with a male threaded fastening section wherein a flank angle α of the pressure flank is 10°, a flank angle β of the clearance flank is 50°, one pitch P of the thread ridge is 1.5 mm, the crest surface width is 0.408 mm, and the root surface width is 0.408 mm is manufactured. Further, a holder with a female threaded fastening section wherein an angle γ of the screwing surface of the pressure flank is 10°, an angle δ of the screwing surface of the clearance flank is 50°, one pitch P of the thread ridge is 1.5 mm, the crest screwing surface width is 0.408 mm, and the root screwing surface width is 0.408 mm is manufactured. An exchangeable tip cutting tool of Comparative Example 1 is manufactured by screwing this machining head to the holder. That is, the exchangeable tip cutting tool of Comparative Example 1 manufactured has the machining head provided with the flank angle α of the pressure flank that is 40° smaller than the flank angle β of the clearance flank and the holder provided with the angle γ of the screwing surface of the pressure flank that is 40° smaller than the angle δ of the screwing surface of the clearance flank.

As a common specification for Reference example 1 of the present invention, Conventional Example 1, and Comparative Example 1, the machining head is made of WC-based cemented carbide (made by Hitachi Tool Engineering, examined results are shown in Table 1. The result 'Pass' in Table 1 indicates that there is no breakage of the male threaded fastening section of the machining head occurred, and 'Fail' indicates that there is breakage of the male threaded fastening section of the machining head occurred in cutting at each feed rate. Here, "breakage of the male threaded fastening section" means the state in which the male threaded fastening section itself breaks and is unable to be screwed to the holder.

TABLE 1

| | Machining Head | | | | Holder | | | | length of 1 pitch | | | | | |
|---|---|---|---|---|---|---|---|---|---|---|---|---|---|---|
| | flank angle α of the pressure flank (°) | flank angle β of the clearance flank (°) | crest surface width (mm) | root surface width (mm) | angle γ of the screwing surface of the pressure flank (°) | angle δ of the screwing surface of the clearance flank (°) | crest screwing surface width (mm) | root screwing surface width (mm) | P of the thread ridge (mm) | taper angle (°) | Feed rate Vf (mm/min) | | | |
| Example No. | | | | | | | | | | | 800 | 900 | 1000 | 1200 |
| Embodiment 1 | 50 | 10 | 0.408 | 0.408 | 50 | 10 | 0.408 | 0.408 | 1.5 | 0 | Pass | Pass | Pass | Pass |
| Conventional 1 | 30 | 30 | 0.211 | 0.211 | 30 | 30 | 0.211 | 0.211 | 1.0 | 0 | Pass | Fail | | |
| Comparative 1 | 10 | 50 | 0.408 | 0.408 | 10 | 50 | 0.408 | 0.408 | 1.5 | 0 | Fail | | | |

Ltd., material name: NM15, Co content: 11% by weight). However, similar results are obtained by using the high-speed tool steel (made by Hitachi Tool Engineering, Ltd., material name: HAP72). The holder is made of WC-based cemented carbide (made by Hitachi Tool Engineering, Ltd., material name: NC60, Co content: 16% by weight). However, similar results are obtained by using the high-speed tool steel (made by Hitachi Tool Engineering, Ltd., material name: HAP72). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge measured in the direction of the tool axis is 10 mm, the nominal diameter of the male threaded fastening section d is 6 mm, the length of the thread of the male threaded fastening section measured in the direction of the tool axis O is 6 mm, the diameter of the female threaded fastening section is 6 mm, and the length of the thread of the female threaded fastening section measured in the direction of the tool axis O is 8 mm. "Taper angle" is the taper angle of the contact surface of the machining head and the holder shown in FIG. 3-FIG. 5. In the examples below, the taper angle is 0° if not specified.

The pre-hardened steel HRC40 is used as a work material in cutting with constant projecting amount of the exchangeable tip cutting tool which is 40 mm. The cutting conditions are: the number of revolution is fixed at 3240 $min^{-1}$, the depth of cut in axis direction is fixed at 5 mm, and the depth of cut in the diameter direction is fixed at 1 mm. The stability of the machining is examined whether cutting of 10 m is possible or not at each feed rate from 700 mm/min up to 1200 mm/min, which is increased by 100 mm/min at a time. An air blow is used to cool down the tool and to eliminate chips.

As an evaluation basis, the exchangeable tip cutting tool is satisfactory if stable cutting can be performed without breakage of the male threaded fastening section in the machining head at the feed rate from 700 mm/min to 1200 mm/min, which is increased by 100 mm/min at a time. The From the results shown in Table 1, machining with Reference example 1 of the present invention is sufficient since stable machining is possible at the feed rate of 1200 mm/min without breakage of the male threaded fastening section. However, as for the machining with Conventional Example 1 and the Comparative Example 1, high effective machining is impossible and the machining is insufficient because there is breakage occurred during cutting at the feed rate of 900 mm/min for Conventional Example 1 and at 800 mm/min for Comparative Example 1. From these results, it is possible to say that efficient machining in which the feed rate is 1.5 or more times as high as the conventional exchangeable tip cutting tools can be carried out without breakage of the male threaded fastening section with Reference example 1 of the present invention in which the machining head has the flank angle of the pressure flank provided to be larger than the flank angle of the clearance flank and the holder has the angle γ of the screwing surface of the pressure flank provided to be larger than the angle δ of the screwing surface of the clearance flank.

Example 2

Exchangeable tip cutting tools of Reference examples 2 to 9 of the present invention are prepared and cutting is evaluated to compare the change in rigidity of the thread ridges of the male fastening section, the change in rigidity at the rear end of the machining head, and the tool abrasion during cutting at various angular differences between the flank angle α of the pressure flank and the flank angle β of the clearance flank, and between the angle γ of the screwing surface of the pressure flank and the angle δ of the screwing surface of the clearance flank.

For Reference example 2 of the present invention, a machining head with a male threaded fastening section wherein a flank angle α of the pressure flank is 50°, a flank angle β of the clearance flank is 45°, the crest surface width is 0.452 mm, and the root surface width is 0.452 mm is manufactured. Further, a holder with a female threaded fastening section wherein an angle γ of the screwing surface of the pressure flank is 50°, an angle δ of the screwing surface of the clearance flank is 45°, the crest screwing surface width is 0.452 mm, and the root screwing surface width is 0.452 mm is manufactured. An exchangeable tip cutting tool of Reference example 2 of the present invention is manufactured by screwing this machining head to the holder. That is, the exchangeable tip cutting tool of Reference example 2 of the present invention manufactured has the machining head provided with the flank angle α of the pressure flank that is 5° larger than the flank angle β of the clearance flank and the holder provided with the angle γ of the screwing surface of the pressure flank that is 5° larger than the angle δ of the screwing surface of the clearance flank.

For Reference example 3 of the present invention, a machining head with a male threaded fastening section wherein a flank angle α of the pressure flank is 50°, a flank angle β of the clearance flank is 40°, the crest surface width is 0.492 mm, and the root surface width is 0.492 mm is manufactured. Further, a holder with a female threaded fastening section wherein an angle γ of the screwing surface of the pressure flank is 50°, an angle δ of the screwing surface of the clearance flank is 40°, the crest screwing surface width is 0.492 mm, and the root screwing surface width is 0.492 mm is manufactured. An exchangeable tip cutting tool of Reference example 3 of the present invention is manufactured by screwing this machining head to the holder. That is, the exchangeable tip cutting tool of Reference example 3 of the present invention manufactured has the machining head provided with the flank angle α of the pressure flank that is 10° larger than the flank angle β of the clearance flank and the holder provided with the angle γ of the screwing surface of the pressure flank that is 10° larger than the angle δ of the screwing surface of the clearance flank.

For Reference example 4 of the present invention, a machining head with a male threaded fastening section wherein a flank angle α of the pressure flank is 50°, a flank angle β of the clearance flank is 30°, the crest surface width is 0.558 mm, and the root surface width is 0.558 mm is manufactured. Further, a holder with a female threaded fastening section wherein an angle γ of the screwing surface of the pressure flank is 50°, an angle δ of the screwing surface of the clearance flank is 30°, the crest screwing surface width is 0.558 mm, and the root screwing surface width is 0.558 mm is manufactured. An exchangeable tip cutting tool of Reference example 4 of the present invention is manufactured by screwing this machining head to the holder. That is, the exchangeable tip cutting tool of Reference example 4 of the present invention manufactured has the machining head provided with the flank angle α of the pressure flank that is 20° larger than the flank angle β of the clearance flank and the holder provided with the angle γ of the screwing surface of the pressure flank that is 20° larger than the angle δ of the screwing surface of the clearance flank.

For Reference example 5 of the present invention, a machining head with a male threaded fastening section wherein a flank angle α of the pressure flank is 50°, a flank angle β of the clearance flank is 20°, the crest surface width is 0.611 mm, and the root surface width is 0.611 mm is manufactured. Further, a holder with a female threaded fastening section wherein an angle γ of the screwing surface of the pressure flank is 50°, an angle δ of the screwing surface of the clearance flank is 20°, the crest screwing surface width is 0.611 mm, and the root screwing surface width is 0.611 mm is manufactured. An exchangeable tip cutting tool of Reference example 5 of the present invention is manufactured by screwing this machining head to the holder. That is, the exchangeable tip cutting tool of Reference example 5 of the present invention manufactured has the machining head provided with the flank angle α of the pressure flank that is 30° larger than the flank angle β of the clearance flank and the holder provided with the angle γ of the screwing surface of the pressure flank that is 30° larger than the angle δ of the screwing surface of the clearance flank.

For Reference example 6 of the present invention, a machining head with a male threaded fastening section wherein a flank angle α of the pressure flank is 50°, a flank angle β of the clearance flank is 10°, the crest surface width is 0.658 mm, and the root surface width is 0.658 mm is manufactured. Further, a holder with a female threaded fastening section wherein an angle γ of the screwing surface of the pressure flank is 50°, an angle δ of the screwing surface of the clearance flank is 10°, the crest screwing surface width is 0.658 mm, and the root screwing surface width is 0.658 mm is manufactured. An exchangeable tip cutting tool of Reference example 6 of the present invention is manufactured by screwing this machining head to the holder. That is, the exchangeable tip cutting tool of Reference example 6 of the present invention manufactured has the machining head provided with the flank angle α of the pressure flank that is 40° larger than the flank angle β of the clearance flank and the holder provided with the angle γ of the screwing surface of the pressure flank that is 40° larger than the angle δ of the screwing surface of the clearance flank.

For Reference example 7 of the present invention, a machining head with a male threaded fastening section wherein a flank angle α of the pressure flank is 60°, a flank angle β of the clearance flank is 10°, the crest surface width is 0.523 mm, and the root surface width is 0.523 mm is manufactured. Further, a holder with a female threaded fastening section wherein an angle γ of the screwing surface of the pressure flank is 60°, an angle δ of the screwing surface of the clearance flank is 10°, the crest screwing surface width is 0.523 mm, and the root screwing surface width is 0.523 mm is manufactured. An exchangeable tip cutting tool of Reference example 7 of the present invention is manufactured by screwing this machining head to the holder. That is, the exchangeable tip cutting tool of Reference example 7 of the present invention manufactured has the machining head provided with the flank angle α of the pressure flank that is 50° larger than the flank angle β of the clearance flank and the holder provided with the angle γ of the screwing surface of the pressure flank that is 50° larger than the angle δ of the screwing surface of the clearance flank.

For Reference example 8 of the present invention, a machining head with a male threaded fastening section wherein a flank angle α of the pressure flank is 70°, a flank angle β of the clearance flank is 10°, the crest surface width is 0.269 mm, and the root surface width is 0.269 mm is manufactured. Further, a holder with a female threaded fastening section wherein an angle γ of the screwing surface of the pressure flank is 70°, an angle δ of the screwing surface of the clearance flank is 10°, the crest screwing surface width is 0.269 mm, and the root screwing surface width is 0.269 mm is manufactured. An exchangeable tip cutting tool of Reference example 8 of the present invention is manufactured by screwing this machining head to the holder. That is, the exchangeable tip cutting tool of Reference example 8 of the present invention manufactured has the machining head provided with the flank angle α of the pressure flank that is 60° larger than the flank angle β of the clearance flank and the holder provided with the angle γ of the screwing surface of the pressure flank that is 60° larger than the angle δ of the screwing surface of the clearance flank.

For Reference example 9 of the present invention, a machining head with a male threaded fastening section wherein a flank angle α of the pressure flank is 70°, a flank angle β of the clearance flank is 5°, the crest surface width is 0.291 mm, and the root surface width is 0.291 mm is manufactured. Further, a holder with a female threaded fastening section wherein an angle γ of the screwing surface of the pressure flank is 70°, an angle δ of the screwing surface of the clearance flank is 5°, the crest screwing surface width is 0.291 mm, and the root screwing surface width is 0.291 mm is manufactured. An exchangeable tip cutting tool of Reference example 9 of the present invention is manufactured by screwing this machining head to the holder. That is, the exchangeable tip cutting tool of Reference example 9 of the present invention manufactured has the machining head provided with the flank angle α of the pressure flank that is 65° larger than the flank angle β of the clearance flank and the holder provided with the angle γ of the screwing surface of the pressure flank that is 65° larger than the angle δ of the screwing surface of the clearance flank.

As a common specification for Reference examples from 2 to 9 of the present invention, the machining head is made of WC-based cemented carbide (made by Hitachi Tool Engineering, Ltd., material name: NM15, Co content: 11% by weight). However, similar results are obtained by using the high-speed tool steel (made by Hitachi Tool Engineering, Ltd., material name: HAP72). The holder is made of WC-based cemented carbide (made by Hitachi Tool Engineering, Ltd., material name: NC60, Co content: 16% by weight). However, similar results are obtained by using the high-speed tool steel (made by Hitachi Tool Engineering, Ltd., material name: HAP72). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge is 10 mm, the nominal diameter of the male threaded fastening section d is 6 mm, the length of the thread of the male threaded fastening section is 6 mm, the diameter of the female threaded fastening section is 6 mm, the length of the thread of the female threaded fastening section is 8 mm, one pitch P of the thread ridge for the male and female threaded fastening section is 2 mm, and the taper angle is 0° in the male and female threaded fastening sections.

The pre-hardened steel HRC40 is used as a work material in cutting with constant projecting amount of the exchangeable tip cutting tool which is 40 mm. The cutting conditions are: the number of revolution is fixed at 3240 min$^{-1}$, the feed rate is fixed at 1200 mm/min, the depth of cut in axis direction is fixed at 5 mm, and the depth of cut in the diameter direction is fixed at 1 mm. The abrasion status of the tool after cutting machining distance of 50 m is examined. An air blow is used to cool down the tool and to eliminate chips.

As an evaluation method, the maximum flank abrasion width on each of the four peripheral edges of the square end mill is measured under an optical tool microscope after 50 m of cutting and its average value is calculated. In addition, an optical tool microscope is used to check whether there is fracture at the thread ridges of the male threaded fastening section and at the rear end of the machining head, that is the corner (thread ridge) formed by the surface 19 formed by chamfering and the flank surface of the pressure flank 11.

As an evaluation basis, the exchangeable tip cutting tool is satisfactory if there is no fracture at the male threaded fastening section and at the rear end of the machining head, and the average value of the flank abrasion width is 0.2 mm or less after 50 m of cutting. The results of the examination are shown in Table 2.

TABLE 2

| | Machining Head | | | | | Holder | | | | | existence of fracture at the male threaded fastening section | existence of fracture at the rear end of the machining head | average value of the flank abrasion width (mm) |
|---|---|---|---|---|---|---|---|---|---|---|---|---|---|
| Example No. | flank angle α of the pressure flank (°) | flank angle β of the clearance flank (°) | difference between angle α and angle β (°) | crest surface width (mm) | root surface width (mm) | angle γ of the screwing surface of the pressure flank (°) | angle δ of the screwing surface of the clearance flank (°) | difference between angle γ and angle δ (°) | crest screwing surface width (mm) | root screwing surface width (mm) | | | |
| Embodiment 2 | 50 | 45 | 5 | 0.452 | 0.452 | 50 | 45 | 5 | 0.452 | 0.452 | None | None | 0.154 |
| Embodiment 3 | 50 | 40 | 10 | 0.492 | 0.492 | 50 | 40 | 10 | 0.492 | 0.492 | None | None | 0.098 |
| Embodiment 4 | 50 | 30 | 20 | 0.558 | 0.558 | 50 | 30 | 20 | 0.558 | 0.558 | None | None | 0.092 |
| Embodiment 5 | 50 | 20 | 30 | 0.611 | 0.611 | 50 | 20 | 30 | 0.611 | 0.611 | None | None | 0.065 |
| Embodiment 6 | 50 | 10 | 40 | 0.658 | 0.658 | 50 | 10 | 40 | 0.658 | 0.658 | None | None | 0.072 |
| Embodiment 7 | 60 | 10 | 50 | 0.523 | 0.523 | 60 | 10 | 50 | 0.523 | 0.523 | None | None | 0.068 |
| Embodiment 8 | 70 | 10 | 60 | 0.269 | 0.269 | 70 | 10 | 60 | 0.269 | 0.269 | None | None | 0.122 |
| Embodiment 9 | 70 | 5 | 65 | 0.291 | 0.291 | 70 | 5 | 65 | 0.291 | 0.291 | None | None | 0.163 |

From the results shown in Table 2, Reference examples from 2 to 9 are sufficient since there is no fracture at the male threaded fastening section and at the rear end of the machining head, and the average value of the flank abrasion width is 0.2 mm or less after 50 m of cutting.

Particularly, for the Reference examples 2 to 8 having the machining head provided with the flank angle α of the pressure flank larger in the range between 10° and 60° than the flank angle β of the clearance flank and with the holder provided with the angle γ of the screwing surface of the pressure flank larger in the range between 10° and 60° than the angle δ of the screwing surface of the clearance flank, further long hours cutting is possible since the average value of the flank abrasion width at the peripheral edges is 0.15 mm or less even after 50 m of cutting.

Example 3

Exchangeable tip cutting tools of Reference examples 10 to 14 of the present invention are prepared and cutting is evaluated to compare the change in rigidity of the thread ridges of the male fastening section, the change in the accuracy of centering when the machining head is screwed with the holder, and the tool abrasion during cutting at various flank angles α of the pressure flank and various angles γ of the screwing surface of the pressure flank.

For Reference example 10 of the present invention, a machining head with a male threaded fastening section wherein a flank angle α of the pressure flank is 30°, a flank angle β of the clearance flank is 20°, the crest surface width is 0.764 mm, and the root surface width is 0.764 mm is manufactured. Further, a holder with a female threaded fastening section wherein an angle γ of the screwing surface of the pressure flank is 30°, an angle δ of the screwing surface of the clearance flank is 20°, the crest screwing surface width is 0.764 mm, and the root screwing surface width is 0.764 mm is manufactured. An exchangeable tip cutting tool of Reference example 10 of the present invention is manufactured by screwing this machining head to the holder. That is, the exchangeable tip cutting tool of Reference example 10 of the present invention manufactured has the machining head provided with the flank angle α of the pressure flank at 30° and the holder provided with the angle γ of the screwing surface of the pressure flank at 30°.

For Reference example 11 of the present invention, a machining head with a male threaded fastening section wherein a flank angle α of the pressure flank is 35°, a flank angle β of the clearance flank is 20°, the crest surface width is 0.734 mm, and the root surface width is 0.734 mm is manufactured. Further, a holder with a female threaded fastening section wherein an angle γ of the screwing surface of the pressure flank is 35°, an angle δ of the screwing surface of the clearance flank is 20°, the crest screwing surface width is 0.734 mm, and the root screwing surface width is 0.734 mm is manufactured. An exchangeable tip cutting tool of Reference example 11 of the present invention is manufactured by screwing this machining head to the holder. That is, the exchangeable tip cutting tool of Reference example 11 of the present invention manufactured has the machining head provided with the flank angle α of the pressure flank at 35° and the holder provided with the angle γ of the screwing surface of the pressure flank at 35°.

For Reference example 12 of the present invention, a machining head with a male threaded fastening section wherein a flank angle α of the pressure flank is 45°, a flank angle β of the clearance flank is 30°, the crest surface width is 0.605 mm, and the root surface width is 0.605 mm is manufactured. Further, a holder with a female threaded fastening section wherein an angle γ of the screwing surface of the pressure flank is 45°, an angle δ of the screwing surface of the clearance flank is 30°, the crest screwing surface width is 0.605 mm, and the root screwing surface width is 0.605 mm is manufactured. An exchangeable tip cutting tool of Reference example 12 of the present invention is manufactured by screwing this machining head to the holder. That is, the exchangeable tip cutting tool of Reference example 12 of the present invention manufactured has the machining head provided with the flank angle α of the pressure flank at 45° and the holder provided with the angle γ of the screwing surface of the pressure flank at 45°.

For Reference example 13 of the present invention, a machining head with a male threaded fastening section wherein a flank angle α of the pressure flank is 60°, a flank angle β of the clearance flank is 30°, the crest surface width is 0.423 mm, and the root surface width is 0.423 mm is manufactured. Further, a holder with a female threaded fastening section wherein an angle γ of the screwing surface of the pressure flank is 60°, an angle δ of the screwing surface of the clearance flank is 30°, the crest screwing surface width is 0.423 mm, and the root screwing surface width is 0.423 mm is manufactured. An exchangeable tip cutting tool of Reference example 13 of the present invention is manufactured by screwing this machining head to the holder. That is, the exchangeable tip cutting tool of Reference example 13 of the present invention manufactured has the machining head provided with the flank angle α of the pressure flank at 60° and the holder provided with the angle γ of the screwing surface of the pressure flank at 60°.

For Reference example 14 of the present invention, a machining head with a male threaded fastening section wherein a flank angle α of the pressure flank is 65°, a flank angle β of the clearance flank is 30°, the crest surface width is 0.319 mm, and the root surface width is 0.319 mm is manufactured. Further, a holder with a female threaded fastening section wherein an angle γ of the screwing surface of the pressure flank is 65°, an angle δ of the screwing surface of the clearance flank is 30°, the crest screwing surface width is 0.319 mm, and the root screwing surface width is 0.319 mm is manufactured. An exchangeable tip cutting tool of Reference example 14 of the present invention is manufactured by screwing this machining head to the holder. That is, the exchangeable tip cutting tool of Reference example 14 of the present invention manufactured has the machining head provided with the flank angle α of the pressure flank at 65° and the holder provided with the angle γ of the screwing surface of the pressure flank at 65°.

As a common specification for Reference examples from 10 to 14 of the present invention, the machining head is made of WC-based cemented carbide (made by Hitachi Tool Engineering, Ltd., material name: NM15, Co content: 11% by weight). However, similar results are obtained by using the high-speed tool steel (made by Hitachi Tool Engineering, Ltd., material name: HAP72). The holder is made of WC-based cemented carbide (made by Hitachi Tool Engineering, Ltd., material name: NC60, Co content: 16% by weight). However, similar results are obtained by using the high-speed tool steel (made by Hitachi Tool Engineering, Ltd., material name: HAP72). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge is 10 mm, the nominal diameter of the male threaded fastening section d is 6 mm, the length of the thread of the male threaded fastening section is 6 mm, the diameter of the female threaded fastening section is 6 mm, the length of the thread of the female threaded fastening section is 8 mm, one pitch P of the thread ridge for the male and female threaded fastening section is 2 mm, and the taper angle is 0° in the male and female threaded fastening sections.

The pre-hardened steel HRC40 is used as a work material in cutting with constant projecting amount of the exchangeable tip cutting tool which is 40 mm. The cutting conditions are: the number of revolution is fixed at 3240 min$^{-1}$, the feed rate is fixed at 1200 mm/min, the depth of cut in axis direction is fixed at 5 mm, and the depth of cut in the diameter direction is fixed at 1 mm. The abrasion status of the tool after cutting machining distance of 50 m is examined. An air blow is used to cool down the tool and to eliminate chips.

As an evaluation method, to check the change in accuracy of centering when screwing the machining head with the holder, the runout of the peripheral edges, namely the runout of the cutting edges, when attached to the main axis of the machining center is measured with a dial gauge before cutting. In addition, the maximum flank abrasion width on each of the four peripheral edges of the square end mill is measured under an optical tool microscope after 50 m of cutting and its average value is calculated. Furthermore, an optical tool microscope is used to check whether there is fracture at the thread ridges of the male threaded fastening section.

As an evaluation basis, the exchangeable tip cutting tool is satisfactory if the runout of the cutting edges when the machining head is screwed with the holder is 30 μm or less before cutting, there is no fracture at the male threaded fastening section, and the average value of the flank abrasion width is 0.2 mm or less after 50 m of cutting. The results of the examination are shown in Table 3.

wherein a flank angle α of the pressure flank is 40°, a flank angle β of the clearance flank is 0°, the crest surface width is 0.790 mm, and the root surface width is 0.790 mm is manufactured. Further, a holder with a female threaded fastening section wherein an angle γ of the screwing surface of the pressure flank is 40°, an angle δ of the screwing surface of the clearance flank is 0°, the crest screwing surface width is 0.790 mm, and the root screwing surface width is 0.790 mm is manufactured. An exchangeable tip cutting tool of Reference example 15 of the present invention is manufactured by screwing this machining head to the holder. That is, the exchangeable tip cutting tool of Reference example 15 of the present invention manufactured has the machining head provided with the flank angle β of the clearance flank at 0° and the holder provided with the angle δ of the screwing surface of the clearance flank at 0°.

For Reference example 16 of the present invention, a machining head with a male threaded fastening section wherein a flank angle α of the pressure flank is 40°, a flank angle β of the clearance flank is 10°, the crest surface width is 0.746 mm, and the root surface width is 0.746 mm is manufactured. Further, a holder with a female threaded

TABLE 3

| Example No. | Machining Head | | | | Holder | | | | runout of the cutting edges (μm) | existence of fracture at the male threaded fastening section | average value of the flank abrasion width (mm) |
| | flank angle α of the pressure flank (°) | flank angle β of the clearance flank (°) | crest surface width (mm) | root surface width (mm) | angle γ of the screwing surface of the pressure flank (°) | angle δ of the screwing surface of the clearance flank (°) | crest screwing surface width (mm) | root screwing surface width (mm) | | | |
|---|---|---|---|---|---|---|---|---|---|---|---|
| Embodiment 10 | 30 | 20 | 0.764 | 0.764 | 30 | 20 | 0.764 | 0.764 | 24 | None | 0.124 |
| Embodiment 11 | 35 | 20 | 0.734 | 0.734 | 35 | 20 | 0.734 | 0.734 | 12 | None | 0.063 |
| Embodiment 12 | 45 | 30 | 0.605 | 0.605 | 45 | 30 | 0.605 | 0.605 | 13 | None | 0.067 |
| Embodiment 13 | 60 | 30 | 0.423 | 0.423 | 60 | 30 | 0.423 | 0.423 | 15 | None | 0.094 |
| Embodiment 14 | 65 | 30 | 0.319 | 0.319 | 65 | 30 | 0.319 | 0.319 | 28 | None | 0.113 |

From the results shown in Table 3, Reference examples from 10 to 14 are sufficient since the runout of the cutting edges when the machining head is screwed with the holder is 30 μm or less before cutting, there is no fracture at the male threaded fastening section, and the average value of the flank abrasion width is 0.2 mm or less after 50 m of cutting.

Particularly, for the Reference examples 11 to 13 having the machining head provided with the flank angle α of the pressure flank in the range between 35° and 60° and with the holder provided with the angle γ of the screwing surface of the pressure flank in the range between 35° and 60°, further long-hours cutting is possible since the runout of the cutting edges when the machining head is screwed with the holder is 15 μm or less before cutting and the average value of the flank abrasion width at the peripheral edges is 0.1 mm or less even after 50 m of cutting.

Example 4

Exchangeable tip cutting tools of Reference examples 15 to 18 of the present invention are prepared and cutting is evaluated to compare the change in rigidity of the thread ridges of the male fastening section and the tool abrasion during cutting at various flank angles β of the clearance flank and angles δ of the screwing surface of the clearance flank.

For Reference example 15 of the present invention, a machining head with a male threaded fastening section fastening section wherein an angle γ of the screwing surface of the pressure flank is 40°, an angle δ of the screwing surface of the clearance flank is 10°, the crest screwing surface width is 0.746 mm, and the root screwing surface width is 0.746 mm is manufactured. An exchangeable tip cutting tool of Reference example 16 of the present invention is manufactured by screwing this machining head to the holder. That is, the exchangeable tip cutting tool of Reference example 16 of the present invention manufactured has the machining head provided with the flank angle β of the clearance flank at 10° and the holder provided with the angle δ of the screwing surface of the clearance flank at 10°.

For Reference example 17 of the present invention, a machining head with a male threaded fastening section wherein a flank angle α of the pressure flank is 40°, a flank angle β of the clearance flank is 25°, the crest surface width is 0.673 mm, and the root surface width is 0.673 mm is manufactured. Further, a holder with a female threaded fastening section wherein an angle γ of the screwing surface of the pressure flank is 40°, an angle δ of the screwing surface of the clearance flank is 25°, the crest screwing surface width is 0.673 mm, and the root screwing surface width is 0.673 mm is manufactured. An exchangeable tip cutting tool of Reference example 17 of the present invention is manufactured by screwing this machining head to the holder. That is, the exchangeable tip cutting tool of Reference example 17 of the present invention manufactured has the machining head provided with the flank angle β of the clearance flank at 25° and the holder provided with the angle δ of the screwing surface of the clearance flank at 25°.

For Reference example 18 of the present invention, a machining head with a male threaded fastening section wherein a flank angle α of the pressure flank is 40°, a flank angle β of the clearance flank is 30°, the crest surface width is 0.646 mm, and the root surface width is 0.646 mm is manufactured. Further, a holder with a female threaded fastening section wherein an angle γ of the screwing surface of the pressure flank is 40°, an angle δ of the screwing surface of the clearance flank is 30°, the crest screwing surface width is 0.646 mm, and the root screwing surface width is 0.646 mm is manufactured. An exchangeable tip cutting tool of Reference example 18 of the present invention is manufactured by screwing this machining head to the holder. That is, the exchangeable tip cutting tool of Reference example 18 of the present invention manufactured has the machining head provided with the flank angle β of the clearance flank at 30° and the holder provided with the angle δ of the screwing surface of the clearance flank at 30°.

As a common specification for Reference examples from 15 to 18 of the present invention, the machining head is made of WC-based cemented carbide (made by Hitachi Tool Engineering, Ltd., material name: NM15, Co content: 11% by weight). However, similar results are obtained by using the high-speed tool steel (made by Hitachi Tool Engineering, Ltd., material name: HAP72). The holder is made of WC-based cemented carbide (made by Hitachi Tool Engineering, Ltd., material name: NC60, Co content: 16% by weight). However, similar results are obtained by using the high-speed tool steel (made by Hitachi Tool Engineering, Ltd., material name: HAP72). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge is 10 mm, the nominal diameter of the male threaded fastening section d is 6 mm, the length of the thread of the male threaded fastening section is 6 mm, the diameter of the female threaded fastening section is 6 mm, the length of the thread of the female threaded fastening section is 8 mm, one pitch P of the thread ridge for the male and female threaded fastening section is 2 mm, and the taper angle is 0° in the male and female threaded fastening sections.

The pre-hardened steel HRC40 is used as a work material in cutting with constant projecting amount of the exchangeable tip cutting tool which is 40 mm. The cutting conditions are: the number of revolution is fixed at 3240 min$^{-1}$, the feed rate is fixed at 1200 mm/min, the depth of cut in axis direction is fixed at 5 mm, and the depth of cut in the diameter direction is fixed at 1 mm. The abrasion status of the tool after cutting machining distance of 50 m is examined. An air blow is used to cool down the tool and to eliminate chips.

As an evaluation method, the maximum flank abrasion width on each of the four peripheral edges of the square end mill is measured under an optical tool microscope after 50 m of cutting and its average value is calculated. In addition, an optical tool microscope is used to check whether there is fracture at the thread ridges of the male threaded fastening section.

As an evaluation basis, the exchangeable tip cutting tool is satisfactory if there is no fracture at the male threaded fastening section and the average value of the flank abrasion width is 0.2 mm or less after 50 m of cutting. The results of the examination are shown in Table 4.

TABLE 4

| | Machining Head | | | | Holder | | | | | |
| --- | --- | --- | --- | --- | --- | --- | --- | --- | --- | --- |
| Example No. | flank angle α of the pressure flank (°) | flank angle β of the clearance flank (°) | crest surface width (mm) | root surface width (mm) | angle γ of the screwing surface of the pressure flank (°) | angle δ of the screwing surface of the clearance flank (°) | crest screwing surface width (mm) | root screwing surface width (mm) | existence of fracture at the male threaded fastening section | average value of the flank abrasion width (mm) |
| Embodiment 15 | 40 | 0 | 0.790 | 0.790 | 40 | 0 | 0.790 | 0.790 | None | 0.053 |
| Embodiment 16 | 40 | 10 | 0.746 | 0.746 | 40 | 10 | 0.746 | 0.746 | None | 0.057 |
| Embodiment 17 | 40 | 25 | 0.673 | 0.673 | 40 | 25 | 0.673 | 0.673 | None | 0.050 |
| Embodiment 18 | 40 | 30 | 0.646 | 0.646 | 40 | 30 | 0.646 | 0.646 | None | 0.084 |

From the results shown in Table 4, Reference examples from 15 to 18 are sufficient since there is no fracture at the male threaded fastening section and the average value of the flank abrasion width is 0.2 mm or less after 50 m of cutting.

Particularly, for the Reference examples 15 to 17 having the machining head provided with the flank angle β of the clearance flank in the range between 0° and 25° and with the holder provided with the angle δ of the screwing surface of the clearance flank in the range between 0° and 25°, further long-hours cutting is possible since the average value of the flank abrasion width at the peripheral edges is 0.06 mm or less even after 50 m of cutting.

Example 5

Exchangeable tip cutting tools of Reference examples 19 to 23 of the present invention are prepared and cutting is evaluated to compare the change in rigidity of the thread ridges of the male fastening section and the tool abrasion during cutting at various one pitches P of the thread ridges of the male and female threaded fastening sections.

For Reference example 19 of the present invention, a machining head with a male threaded fastening section wherein a flank angle α of the pressure flank is 40°, a flank angle β of the clearance flank is 10°, one pitch P of the thread ridge is 0.6 mm, the crest surface width is 0.046 mm, and the root surface width is 0.046 mm is manufactured. Further, a holder with a female threaded fastening section wherein an angle γ of the screwing surface of the pressure flank is 40°, an angle δ of the screwing surface of the clearance flank is 10°, one pitch P of the thread ridge is 0.6 mm, the crest screwing surface width is 0.046 mm, and the root screwing surface width is 0.046 mm is manufactured. An exchangeable tip cutting tool of Reference example 19 of the present invention is manufactured by screwing this machining head to the holder. That is, the exchangeable tip cutting tool of Reference example 19 of the present invention manufactured has the machining head, in which one pitch P of the thread ridge of the male threaded fastening section is 10% of the nominal diameter d of the male threaded fastening section, and the holder, in which one pitch P of the female threaded fastening section is 10% of the nominal diameter d of the male threaded fastening section.

For Reference example 20 of the present invention, a machining head with a male threaded fastening section wherein a flank angle α of the pressure flank is 40°, a flank angle β of the clearance flank is 10°, one pitch P of the thread ridge is 0.9 mm, the crest surface width is 0.196 mm, and the root surface width is 0.196 mm is manufactured. Further, a holder with a female threaded fastening section wherein an angle γ of the screwing surface of the pressure flank is 40°, an angle δ of the screwing surface of the clearance flank is 10°, one pitch P of the thread ridge is 0.9 mm, the crest screwing surface width is 0.196 mm, and the root screwing surface width is 0.196 mm is manufactured. An exchangeable tip cutting tool of Reference example 20 of the present invention is manufactured by screwing this machining head to the holder. That is, the exchangeable tip cutting tool of Reference example 20 of the present invention manufactured has the machining head, in which one pitch P of the thread ridge of the male threaded fastening section is 15% of the nominal diameter d of the male threaded fastening section, and the holder, in which one pitch P of the female threaded fastening section is 15% of the nominal diameter d of the male threaded fastening section.

For Reference example 21 of the present invention, a machining head with a male threaded fastening section wherein a flank angle α of the pressure flank is 40°, a flank angle β of the clearance flank is 10°, one pitch P of the thread ridge is 1.4 mm, the crest surface width is 0.446 mm, and the root surface width is 0.446 mm is manufactured. Further, a holder with a female threaded fastening section wherein an angle γ of the screwing surface of the pressure flank is 40°, an angle δ of the screwing surface of the clearance flank is 10°, one pitch P of the thread ridge is 1.4 mm, the crest screwing surface width is 0.446 mm, and the root screwing surface width is 0.446 mm is manufactured. An exchangeable tip cutting tool of Reference example 21 of the present invention is manufactured by screwing this machining head to the holder. That is, the exchangeable tip cutting tool of Reference example 21 of the present invention manufactured has the machining head, in which one pitch P of the thread ridge of the male threaded fastening section is 23% of the nominal diameter d of the male threaded fastening section, and the holder, in which one pitch P of the female threaded fastening section is 23% of the nominal diameter d of the male threaded fastening section.

For Reference example 22 of the present invention, a machining head with a male threaded fastening section wherein a flank angle α of the pressure flank is 40°, a flank angle β of the clearance flank is 10°, one pitch P of the thread ridge is 1.8 mm, the crest surface width is 0.646 mm, and the root surface width is 0.646 mm is manufactured. Further, a holder with a female threaded fastening section wherein an angle γ of the screwing surface of the pressure flank is 40°, an angle δ of the screwing surface of the clearance flank is 10°, one pitch P of the thread ridge is 1.8 mm, the crest screwing surface width is 0.646 mm, and the root screwing surface width is 0.646 mm is manufactured. An exchangeable tip cutting tool of Reference example 22 of the present invention is manufactured by screwing this machining head to the holder. That is, the exchangeable tip cutting tool of Reference example 22 of the present invention manufactured has the machining head, in which one pitch P of the thread ridge of the male threaded fastening section is 30% of the nominal diameter d of the male threaded fastening section, and the holder, in which one pitch P of the female threaded fastening section is 30% of the nominal diameter d of the male threaded fastening section.

For Reference example 23 of the present invention, a machining head with a male threaded fastening section wherein a flank angle α of the pressure flank is 40°, a flank angle β of the clearance flank is 10°, one pitch P of the thread ridge is 2.1 mm, the crest surface width is 0.796 mm, and the root surface width is 0.796 mm is manufactured. Further, a holder with a female threaded fastening section wherein an angle γ of the screwing surface of the pressure flank is 40°, an angle δ of the screwing surface of the clearance flank is 10°, one pitch P of the thread ridge is 2.1 mm, the crest screwing surface width is 0.796 mm, and the root screwing surface width is 0.796 mm is manufactured. An exchangeable tip cutting tool of Reference example 23 of the present invention is manufactured by screwing this machining head to the holder. That is, the exchangeable tip cutting tool of Reference example 23 of the present invention manufactured has the machining head, in which one pitch P of the thread ridge of the male threaded fastening section is 35% of the nominal diameter d of the male threaded fastening section, and the holder, in which one pitch P of the female threaded fastening section is 35% of the nominal diameter d of the male threaded fastening section.

As a common specification for Reference examples from 19 to 23 of the present invention, the machining head is made of WC-based cemented carbide (made by Hitachi Tool Engineering, Ltd., material name: NM15, Co content: 11% by weight). However, similar results are obtained by using the high-speed tool steel (made by Hitachi Tool Engineering, Ltd., material name: HAP72). The holder is made of WC-based cemented carbide (made by Hitachi Tool Engineering, Ltd., material name: NC60, Co content: 16% by weight). However, similar results are obtained by using the high-speed tool steel (made by Hitachi Tool Engineering, Ltd., material name: HAP72). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge is 10 mm, the nominal diameter of the male threaded fastening section d is 6 mm, the length of the thread of the male threaded fastening section is 6 mm, the diameter of the female threaded fastening section is 6 mm, the length of the thread of the female threaded fastening section is 8 mm, and the taper angle is 0° in the male and female threaded fastening sections.

The pre-hardened steel HRC40 is used as a work material in cutting with constant projecting amount of the exchangeable tip cutting tool which is 40 mm. The cutting conditions are: the number of revolution is fixed at 3240 $min^{-1}$, the feed rate is fixed at 1200 mm/min, the depth of cut in axis direction is fixed at 5 mm, and the depth of cut in the diameter direction is fixed at 1 mm. The abrasion status of the tool after cutting machining distance of 50 m is examined. An air blow is used to cool down the tool and to eliminate chips.

As an evaluation method, the maximum flank abrasion width on each of the four peripheral edges of the square end mill is measured under an optical tool microscope after 50 m of cutting and its average value is calculated. In addition, an optical tool microscope is used to check whether there is fracture at the thread ridges of the male threaded fastening section.

As an evaluation basis, the exchangeable tip cutting tool is satisfactory if there is no fracture at the male threaded fastening section and the average value of the flank abrasion width is 0.2 mm or less after 50 m of cutting. The results of the examination are shown in Table 5.

the crest screwing surface width and the root screwing surface width of the female threaded fastening section is 9% of the one pitch P of the male threaded fastening section.

For Reference example 25 of the present invention, a machining head with a male threaded fastening section

TABLE 5

| Example No. | Machining Head | | | | Holder | | | | length of 1 pitch P of the thread ridge (mm) | 1 pitch P of thread ridge ratio to the nominal diameter of the male threaded fastening section (%) | existence of fracture at the male threaded fastening section | average value of the flank abrasion width (mm) |
|---|---|---|---|---|---|---|---|---|---|---|---|---|
| | flank angle α of the pressure flank (°) | flank angle β of the clearance flank (°) | crest surface width (mm) | root surface width (mm) | angle γ of the screwing surface of the pressure flank (°) | angle δ of the screwing surface of the clearance flank (°) | crest screwing surface width (mm) | root screwing surface width (mm) | | | | |
| Embodiment 19 | 40 | 10 | 0.046 | 0.046 | 40 | 10 | 0.046 | 0.046 | 0.6 | 10 | None | 0.058 |
| Embodiment 20 | 40 | 10 | 0.196 | 0.196 | 40 | 10 | 0.196 | 0.196 | 0.9 | 15 | None | 0.035 |
| Embodiment 21 | 40 | 10 | 0.446 | 0.446 | 40 | 10 | 0.446 | 0.446 | 1.4 | 23 | None | 0.038 |
| Embodiment 22 | 40 | 10 | 0.646 | 0.646 | 40 | 10 | 0.646 | 0.646 | 1.8 | 30 | None | 0.034 |
| Embodiment 23 | 40 | 10 | 0.796 | 0.796 | 40 | 10 | 0.796 | 0.796 | 2.1 | 35 | None | 0.062 |

From the results shown in Table 5, Reference examples from 19 to 23 are sufficient since there is no fracture at the male threaded fastening section and the average value of the flank abrasion width is 0.2 mm or less after 50 m of cutting.

Particularly, for the Reference examples 20 to 22 in which one pitch P of the thread ridge of the male and female threaded fastening sections is in the range between 15% and 30% of the nominal diameter d of the male threaded fastening section, further longer-hours cutting is possible since the average value of the flank abrasion width at the peripheral edges is 0.04 mm or less even after 50 m of cutting.

Example 6

Exchangeable tip cutting tools of Reference examples 24 to 28 of the present invention are prepared and cutting is evaluated to compare the change in rigidity of the thread ridges of the male fastening section and the tool abrasion during cutting at various crest surface widths and root surface widths of the thread ridges of the male threaded fastening section and also at various crest screwing surface widths and the root screwing surface widths of the female threaded fastening sections.

For Reference example 24 of the present invention, a machining head with a male threaded fastening section wherein a flank angle α of the pressure flank is 50°, a flank angle β of the clearance flank is 15°, one pitch P of the thread ridge is 0.9 mm, the crest surface width is 0.085 mm, and the root surface width is 0.085 mm is manufactured. Further, a holder with a female threaded fastening section wherein an angle γ of the screwing surface of the pressure flank is 50°, an angle δ of the screwing surface of the clearance flank is 15°, one pitch P of the thread ridge is 0.9 mm, the crest screwing surface width is 0.085 mm, and the root screwing surface width is 0.085 mm is manufactured. An exchangeable tip cutting tool of Reference example 24 of the present invention is manufactured by screwing this machining head to the holder. That is, the exchangeable tip cutting tool of Reference example 24 of the present invention manufactured has the machining head, in which the crest surface width and the root surface width of the thread ridge of the male threaded fastening section is 9% of the one pitch P of the male threaded fastening section, and the holder, in which wherein a flank angle α of the pressure flank is 50°, a flank angle β of the clearance flank is 10°, one pitch P of the thread ridge is 1.0 mm, the crest surface width is 0.152 mm, and the root surface width is 0.152 mm is manufactured. Further, a holder with a female threaded fastening section wherein an angle γ of the screwing surface of the pressure flank is 50°, an angle δ of the screwing surface of the clearance flank is 10°, one pitch P of the thread ridge is 1.0 mm, the crest screwing surface width is 0.152 mm, and the root screwing surface width is 0.152 mm is manufactured. An exchangeable tip cutting tool of Reference example 25 of the present invention is manufactured by screwing this machining head to the holder. That is, the exchangeable tip cutting tool of Reference example 25 of the present invention manufactured has the machining head, in which the crest surface width and the root surface width of the thread ridge of the male threaded fastening section is 15% of the one pitch P of the male threaded fastening section, and the holder, in which the crest screwing surface width and the root screwing surface width of the female threaded fastening section is 15% of the one pitch P of the male threaded fastening section.

For Reference example 26 of the present invention, a machining head with a male threaded fastening section wherein a flank angle α of the pressure flank is 50°, a flank angle β of the clearance flank is 10°, one pitch P of the thread ridge is 1.2 mm, the crest surface width is 0.258 mm, and the root surface width is 0.258 mm is manufactured. Further, a holder with a female threaded fastening section wherein an angle γ of the screwing surface of the pressure flank is 50°, an angle δ of the screwing surface of the clearance flank is 10°, one pitch P of the thread ridge is 1.2 mm, the crest screwing surface width is 0.258 mm, and the root screwing surface width is 0.258 mm is manufactured. An exchangeable tip cutting tool of Reference example 26 of the present invention is manufactured by screwing this machining head to the holder. That is, the exchangeable tip cutting tool of Reference example 26 of the present invention manufactured has the machining head, in which the crest surface width and the root surface width of the thread ridge of the male threaded fastening section is 22% of the one pitch P of the male threaded fastening section, and the holder, in which the crest screwing surface width and the root screwing surface width of the female threaded fastening section is 22% of the one pitch P of the male threaded fastening section.

For Reference example 27 of the present invention, a machining head with a male threaded fastening section wherein a flank angle α of the pressure flank is 50°, a flank angle β of the clearance flank is 10°, one pitch P of the thread ridge is 1.7 mm, the crest surface width is 0.508 mm, and the root surface width is 0.508 mm is manufactured. Further, a holder with a female threaded fastening section wherein an angle γ of the screwing surface of the pressure flank is 50°, an angle δ of the screwing surface of the clearance flank is 10°, one pitch P of the thread ridge is 1.7 mm, the crest screwing surface width is 0.508 mm, and the root screwing surface width is 0.508 mm is manufactured. An exchangeable tip cutting tool of Reference example 27 of the present invention is manufactured by screwing this machining head to the holder. That is, the exchangeable tip cutting tool of Reference example 27 of the present invention manufactured has the machining head, in which the crest surface width and the root surface width of the thread ridge of the male threaded fastening section is 30% of the one pitch P of the male threaded fastening section, and the holder, in which the crest screwing surface width and the root screwing surface width of the female threaded fastening section is 30% of the one pitch P of the male threaded fastening section.

For Reference example 28 of the present invention, a machining head with a male threaded fastening section wherein a flank angle α of the pressure flank is 35°, a flank angle β of the clearance flank is 10°, one pitch P of the thread ridge is 1.8 mm, the crest surface width is 0.681 mm, and the root surface width is 0.681 mm is manufactured. Further, a holder with a female threaded fastening section wherein an angle γ of the screwing surface of the pressure flank is 35°, an angle δ of the screwing surface of the clearance flank is 10°, one pitch P of the thread ridge is 1.8 mm, the crest screwing surface width is 0.681 mm, and the root screwing surface width is 0.681 mm is manufactured. An exchangeable tip cutting tool of Reference example 28 of the present invention is manufactured by screwing this machining head to the holder. That is, the exchangeable tip cutting tool of Reference example 28 of the present invention manufactured has the machining head, in which the crest surface width and the root surface width of the thread ridge of the male threaded fastening section is 38% of the one pitch P of the male threaded fastening section, and the holder, in which the crest screwing surface width and the root screwing surface width of the female threaded fastening section is 38% of the one pitch P of the male threaded fastening section.

As a common specification for Reference examples from 24 to 28 of the present invention, the machining head is made of WC-based cemented carbide (made by Hitachi Tool Engineering, Ltd., material name: NM15, Co content: 11% by weight). However, similar results are obtained by using the high-speed tool steel (made by Hitachi Tool Engineering, Ltd., material name: HAP72). The holder is made of WC-based cemented carbide (made by Hitachi Tool Engineering, Ltd., material name: NC60, Co content: 16% by weight). However, similar results are obtained by using the high-speed tool steel (made by Hitachi Tool Engineering, Ltd., material name: HAP72). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge is 10 mm, the nominal diameter of the male threaded fastening section d is 6 mm, the length of the thread of the male threaded fastening section is 6 mm, the diameter of the female threaded fastening section is 6 mm, the length of the thread of the female threaded fastening section is 8 mm, and the taper angle is 0° in the male and female threaded fastening sections.

The pre-hardened steel HRC40 is used as a work material in cutting with constant projecting amount of the exchangeable tip cutting tool which is 40 mm. The cutting conditions are: the number of revolution is fixed at 3240 min$^{-1}$, the feed rate is fixed at 1200 mm/min, the depth of cut in axis direction is fixed at 5 mm, and the depth of cut in the diameter direction is fixed at 1 mm. The abrasion status of the tool after cutting machining distance of 50 m is examined. An air blow is used to cool down the tool and to eliminate chips.

As an evaluation method, the maximum flank abrasion width on each of the four peripheral edges of the square end mill is measured under an optical tool microscope after 50 m of cutting and its average value is calculated. In addition, an optical tool microscope is used to check whether there is fracture at the thread ridges of the male threaded fastening section.

As an evaluation basis, the exchangeable tip cutting tool is satisfactory if there is no fracture at the male threaded fastening section and the average value of the flank abrasion width is 0.2 mm or less after 50 m of cutting. The results of the examination are shown in Table 6.

TABLE 6

| | Machining Head | | | | | | Holder | |
|---|---|---|---|---|---|---|---|---|
| Example No. | flank angle α of the pressure flank (°) | flank angle β of the clearance flank (°) | crest surface width (mm) | ration to the length of 1 pitch P of the thread ridge (%) | root surface width (mm) | ration to the length of 1 pitch P of the thread ridge (%) | angle γ of the screwing surface of the pressure flank (°) | angle δ of the screwing surface of the clearance flank (°) |
| Embodiment 24 | 50 | 15 | 0.085 | 9 | 0.085 | 9 | 50 | 15 |
| Embodiment 25 | 50 | 10 | 0.152 | 15 | 0.152 | 15 | 50 | 10 |
| Embodiment 26 | 50 | 10 | 0.258 | 22 | 0.258 | 22 | 50 | 10 |

TABLE 6-continued

| Example No. | | | | | | | |
|---|---|---|---|---|---|---|---|
| Embodiment 27 | 50 | 10 | 0.508 | 30 | 0.508 | 30 | 50 | 10 |
| Embodiment 28 | 35 | 10 | 0.681 | 38 | 0.681 | 38 | 35 | 10 |

| | Holder | | | | | | |
|---|---|---|---|---|---|---|---|
| Example No. | crest screwing surface width (mm) | ration to the length of 1 pitch P of the thread ridge (%) | root screwing surface width (mm) | ration to the length of 1 pitch P of the thread ridge (%) | length of 1 pitch P of the thread ridge (mm) | existence of fracture at the male threaded fastening section | average value of the flank abrasion width (mm) |
| Embodiment 24 | 0.085 | 9 | 0.085 | 9 | 0.9 | None | 0.035 |
| Embodiment 25 | 0.152 | 15 | 0.152 | 15 | 1.0 | None | 0.023 |
| Embodiment 26 | 0.258 | 22 | 0.258 | 22 | 1.2 | None | 0.022 |
| Embodiment 27 | 0.508 | 30 | 0.508 | 30 | 1.7 | None | 0.024 |
| Embodiment 28 | 0.681 | 38 | 0.681 | 38 | 1.8 | None | 0.038 |

From the results shown in Table 6, Reference examples from 24 to 28 are sufficient since there is no fracture at the male threaded fastening section and the average value of the flank abrasion width is 0.2 mm or less after 50 m of cutting.

Particularly, for the Reference examples 25 to 27 in which the crest and root surface widths of the male threaded fastening section and the crest and root screwing surface widths of the female threaded fastening section are in the range between 15% and 30% of the one pitch P of the thread ridge, further long-hours cutting is possible since the average value of the flank abrasion width at the peripheral edges is 0.03 mm or less even after 50 m of cutting.

Example 7

An exchangeable tip cutting tool of Embodiment 29 below of the present invention is prepared to evaluate effects of the tapered part of the contact surface of the machining head and the holder (FIG. 3-FIG. 5), and cutting is evaluated.

For Embodiment 29 of the present invention, a machining head with a male threaded fastening section wherein a flank angle α of the pressure flank is 50°, a flank angle β of the clearance flank is 10°, one pitch P of the thread ridge is 1.5 mm, the crest surface width is 0.408 mm, and the root surface width is 0.408 mm is manufactured. Further, a holder with a female threaded fastening section wherein an angle γ of the screwing surface of the pressure flank is 50°, an angle δ of the screwing surface of the clearance flank is 10°, one pitch P of the thread ridge is 1.5 mm, the crest screwing surface width is 0.408 mm, and the root screwing surface width is 0.408 mm is manufactured. An exchangeable tip cutting tool of Embodiment 29 of the present invention is manufactured by screwing this machining head to the holder. That is, the exchangeable tip cutting tool of Embodiment 29 of the present invention manufactured has the machining head provided with the flank angle α of the pressure flank that is 40° larger than the flank angle β of the clearance flank and the holder provided with the angle γ of the screwing surface of the pressure flank that is 40° larger than the angle δ of the screwing surface of the clearance flank. The taper angle of the tapered part of the contact surface of the machining head and the holder is 5°. The exchangeable tip cutting tool of Embodiment 29 of the present invention above is manufactured.

For the conventional example, Conventional Example 1 as in Example 1 is used. Also, for Comparative Example 2, a machining head with a male threaded fastening section wherein a flank angle α of the pressure flank is 10°, a flank angle β of the clearance flank is 50°, one pitch P of the thread ridge is 1.5 mm, the crest surface width is 0.408 mm, the root surface width is 0.408 mm, and the taper of 5° decreasing the diameter of the male threaded fastening-section from the rear end toward the tip of the thread is manufactured. Further, a holder with a female threaded fastening section wherein an angle γ of the screwing surface of the pressure flank is 10°, an angle δ of the screwing surface of the clearance flank is 50°, one pitch P of the thread ridge is 1.5 mm, the crest screwing surface width is 0.408 mm, the root screwing surface width is 0.408 mm, and the taper of 5° decreasing the diameter of the female threaded fastening section from the rear end toward the tip of the thread is manufactured. That is, the machining head provided with the flank angle α of the pressure flank that is 40° smaller than the flank angle β of the clearance flank and the taper angle 5°, and the holder provided with the angle γ of the screwing surface of the pressure flank that is 40° smaller than the angle δ of the screwing surface of the clearance flank are manufactured. The taper angle of the tapered part of the contact surface between the machining head and the holder is 5°. The exchangeable tip cutting tool of Comparative Example 2 of the present invention above is manufactured.

As a common specification for Embodiment 29 of the present invention, Conventional Example 1, and Comparative Example 2, the machining head is made of WC-based cemented carbide (made by Hitachi Tool Engineering, Ltd., material name: NM15, Co content: 11% by weight). However, similar results are obtained by using the high-speed tool steel (made by Hitachi Tool Engineering, Ltd., material name: HAP72). The holder is made of chrome-molybdenum steel (JIS standard, material name: SCM440). Also, cutting is performed with the machining head which is manufactured integrally from the tip to the male threaded fastening section, and is a square end mill with four peripheral cutting edges coated with hard film of TiSiN, in which the tool diameter D is 10 mm, the length of the cutting edge section of the peripheral edge is 10 mm, the nominal diameter of the male threaded fastening section d is 6 mm, the length of the thread of the male threaded fastening section is 6 mm, the diameter of the female threaded fastening section is 6 mm, the length of the thread of the female threaded fastening section is 8 mm, and the taper angle is 5° or 0° in the male and female threaded fastening sections.

The pre-hardened steel HRC40 is used as a work material in cutting with constant projecting amount of the exchangeable tip cutting tool which is 40 mm. The cutting conditions are: the number of revolution is fixed at 3240 min$^{-1}$, the depth of cut in axis direction is fixed at 5 mm, and the depth of cut in the diameter direction is fixed at 1 mm. The stability of the machining is examined whether cutting of 10 m is possible or not at each feed rate from 700 mm/min up to 1300 mm/min, which is increased by 100 mm/min at a time. An air blow is used to cool down the tool and to eliminate chips.

As an evaluation basis, the exchangeable tip cutting tool is satisfactory if stable cutting can be performed without breakage of the male threaded fastening section in the machining head at the feed rate from 700 mm/min to 1300 mm/min, which is increased by 100 mm/min at a time. The examined results are shown in Table 7. The result 'Pass' in Table 7 indicates that there is no breakage of the male threaded fastening section of the machining head occurred, and 'Fail' indicates that there is breakage of the male threaded fastening section of the machining head occurred in cutting at each feed rate. Here, "breakage of the male threaded fastening section" means the state in which the male threaded fastening section itself breaks, and is unable to be screwed to the holder.

cutting tools. Also, since the machining head of the present invention has the flank angle of the pressure flank which is greater than the flank angle of the clearance flank, the rigidity at the tip of the male threaded fastening section, which is the rear end of the machining head, is improved and fracture due to tightening torque applied when attaching the machining head is greatly suppressed. Therefore, the exchangeable tip cutting tool of the present invention is ideal for highly effective and long life machining in machining such as parts machining and die machining.

EXPLANATION OF NUMERALS 1, 1a . . . machining head
2, 2a . . . holder
3 . . . chip space
4 . . . peripheral edge
5 . . . cutting edge section
6 . . . male threaded fastening section
6a . . . male threaded fastening section with metric coarse thread
6b . . . male threaded fastening section in Patent Document 1
7 . . . notch
8 . . . female threaded fastening section
8a . . . female threaded fastening section with metric coarse thread

TABLE 7

| | Machining Head | | | | Holder | | | | length of 1 pitch | | | | | |
|---|---|---|---|---|---|---|---|---|---|---|---|---|---|---|
| | flank angle α of the pressure flank (°) | flank angle β of the clearance flank (°) | crest surface width (mm) | root surface width (mm) | angle γ of the screwing surface of the pressure flank (°) | angle δ of the screwing surface of the clearance flank (°) | crest screwing surface width (mm) | root screwing surface width (mm) | P of the thread ridge (mm) | taper angle (°) | Feed rate Vf (mm/min) | | | |
| Example No. | | | | | | | | | | | 800 | 900 | 1000 | 1300 |
| Embodiment 29 | 50 | 10 | 0.408 | 0.408 | 50 | 10 | 0.408 | 0.408 | 1.5 | 5 | Pass | Pass | Pass | Pass |
| Conventional 1 | 30 | 30 | 0.211 | 0.211 | 30 | 30 | 0.211 | 0.211 | 1.0 | 0 | Pass | Fail | | |
| Comparative 2 | 10 | 50 | 0.408 | 0.408 | 10 | 50 | 0.408 | 0.408 | 1.5 | 5 | Pass | Pass | Fail | |

From the results shown in Table 7, machining with Embodiment 29 of the present invention is sufficient since stable machining is possible at the feed rate of 1300 mm/min without breakage of the male threaded fastening section. This result is more satisfactory than Reference example 1 with the taper angle of 0°. However, as for the machining with Conventional Example 1 and the Comparative Example 2, high effective machining is impossible and the machining is insufficient because there is breakage occurred during cutting at the feed rate of 900 mm/min for Conventional Example 1 and at 1000 mm/min for Comparative Example 2. From these results, it is possible to say that efficient machining can be carried out by having a taper at the contact surface of the machining head and the holder and binding the position with two surfaces mentioned above.

INDUSTRIAL APPLICABILITY

By using the exchangeable tip cutting tool with the machining head of the present invention and the holder to be screwed to the machining head, the strength of fastened male threads improves and highly efficient cutting can be performed as compared to the conventional exchangeable tip 8b . . . female threaded fastening section in Patent Document 1
9 . . . bearing surface of machining head
10 . . . end face of holder
11 . . . flank surface of pressure flank
12 . . . flank surface of clearance flank
13 . . . crest surface
14 . . . root surface
15 . . . tension
16 . . . force applied on flank surface of pressure flank
17 . . . force dispersed in the direction perpendicular to tool axis
18 . . . end face of machining head
19 . . . surface formed by chamfering
20 . . . crest surface width
21 . . . root surface width
22 . . . screwing surface of pressure flank
23 . . . screwing surface of clearance flank
24 . . . crest screwing surface
25 . . . root screwing surface
26 . . . force applied on screwing surface of pressure flank
27 . . . tension
28 . . . force dispersed in the direction perpendicular to tool axis 29 . . . crest screwing surface width
30 . . . root screwing surface width
31 . . . tapered part
32 . . . tapered part
D . . . tool diameter
d . . . nominal diameter of male threaded fastening section
P . . . one pitch of thread ridge
α . . . flank angle of pressure flank
β . . . flank angle of clearance flank
γ . . . angle of screwing surface of pressure flank
δ . . . angle of screwing surface of clearance flank
θ . . . angle between surface formed by chamfering and flank surface of pressure flank
O . . . tool axis

What is claimed is:

1. An exchangeable tip cutting tool comprising:
a machining head including:
   a cutting edge section at the tip thereof;
   a male threaded fastening section comprising:
      a tapered part with no threads formed; and
      a male threaded section to be screwed to a holder provided with a female threaded fastening section, the male threaded fastening section being provided at the rear of the cutting edge section in an axial direction; and
   a notch to be attached to the holder, a notch being provided between the cutting edge section and the male threaded fastening section; and
a holder including:
   a female threaded fastening section comprising:
      a tapered part with no threads formed; and
      a female threaded section to which the machining head provided with the male threaded fastening section is screwed, wherein
a thread ridge of the male threaded section of the machining head comprises:
   a flank surface of a pressure flank;
   a flank surface of a clearance flank; and
   a crest surface and a root surface connecting two types of flank surfaces, wherein a flank angle of the pressure flank is provided to be larger than a flank angle of the clearance flank, and the pressure flank is on a side facing the cutting edge section and the clearance flank is on an opposite side facing away from the cutting edge section;
a thread ridge of the female threaded section of the holder comprises:
   a screwing surface of a pressure flank;
   a screwing surface of a clearance flank; and
   a crest screwing surface and a root screwing surface connecting the two types of screwing surfaces, the screwing surface of the pressure flank and the clearance flank, and the crest and the root screwing surfaces corresponding to the flank surface of the pressure flank, the flank surface of the clearance flank, and the crest and the root surfaces connecting the two types of flank surfaces of the male threaded fastening section respectively, wherein an angle of screwing surface of the pressure flank is provided to be larger than an angle of screwing surface of the clearance flank;
the machining head is made of cemented carbide and integrally molded from the tip thereof to the male threaded fastening section;
the holder is made of steel;
the tapered part, which is provided on the side of the notch of the male threaded fastening section, is formed in a linear tapered shape on the outer peripheral surface of a cylindrical part with a taper angle of 0.1° or more and 5.0° or less, the outer diameter of the cylindrical part being decreased toward the tip of the male threaded fastening section;
the tapered part, which is provided on the side of the opening part of the female threaded fastening section, is formed in a linear tapered shape on the inner peripheral surface of a cylindrical part with a taper angle of 0.1° or more and 5.0° or less, the inner diameter of the tapered part being increased toward the opening part of the female threaded fastening section; and
the tapered part of the machining head and the tapered part of the holder make surface contact, and an end face of the notch and an end face of the holder make surface contact.

2. The exchangeable tip cutting tool according to claim 1, wherein,
the machining head has the flank angle of the pressure flank which is 35° or more and 60° or less, the flank angle of the clearance flank which is 0° or more and 25° or less, one pitch of a thread ridge which is 15% or more and 30% or less of the nominal diameter of the male threaded fastening section, and widths of the crest surface and the root surface connecting the two types of flank surfaces each of which is 15% or more and 30% or less of one pitch of a thread ridge when viewed from the direction perpendicular to the tool axis; and
the holder has the angle of screwing surface of the pressure flank which is 35° or more and 60° or less, the angle of screwing surface of the clearance flank which is 0° or more and 25° or less, one pitch of a thread ridge which is 15% or more and 30% or less of the nominal diameter of the male threaded fastening section, and the widths of the crest and the root screwing surfaces connecting the two types of screwing surfaces each of which is 15% or more and 30% or less of one pitch of a thread ridge when viewed from the direction perpendicular to the tool axis.

* * * * *